(12) United States Patent
Hisada et al.

(10) Patent No.: US 10,289,299 B2
(45) Date of Patent: May 14, 2019

(54) IMAGE FORMING APPARATUS AND STORAGE MEDIUM

(71) Applicant: KONICA MINOLTA, INC., Chiyoda-ku, Tokyo (JP)

(72) Inventors: Yukina Hisada, Toyokawa (JP); Masayuki Ito, Nagoya (JP); Kazuhiro Tomiyasu, Toyokawa (JP); Hiroki Ueda, Toyohashi (JP); Kazuaki Kanai, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 388 days.

(21) Appl. No.: 15/195,222

(22) Filed: Jun. 28, 2016

(65) Prior Publication Data

US 2016/0378330 A1    Dec. 29, 2016

(30) Foreign Application Priority Data

Jun. 29, 2015  (JP) ................................. 2015-129794

(51) Int. Cl.
*G06F 3/0488* (2013.01)
*G06F 3/0484* (2013.01)
*G06F 3/0485* (2013.01)
*H04N 1/00* (2006.01)

(52) U.S. Cl.
CPC ...... *G06F 3/04883* (2013.01); *G06F 3/04845* (2013.01); *G06F 3/04847* (2013.01); *H04N 1/00411* (2013.01); *H04N 1/00713* (2013.01); *G06F 2203/04808* (2013.01); *H04N 2201/0094* (2013.01)

(58) Field of Classification Search
CPC ............ G06F 3/04883; G06F 3/04847; G06F 3/04845; G06F 2203/04808; H04N 1/00411; H04N 1/00713; H04N 2201/0094
See application file for complete search history.

(56) References Cited

U.S. PATENT DOCUMENTS 9,325,867 B2 *   4/2016   Kohda ................. H04N 1/0044
2015/0046866 A1 *  2/2015   Shimadate ............ G06F 3/0485
                                              715/776

FOREIGN PATENT DOCUMENTS

JP        2012-121179 A    6/2012

* cited by examiner

*Primary Examiner* — Shourjo Dasgupta
(74) *Attorney, Agent, or Firm* — Buchanan Ingersoll & Rooney PC

(57) ABSTRACT

An image forming apparatus includes: a detection unit that detects a pinch operation that is an operation of increasing or decreasing a distance between two touch positions on a touch panel; an adjustment unit that, upon reception of setting of a size of a non-standard size sheet, adjusts the set size in accordance with the pinch operation; an angle specification unit that specifies, as a pinch operation angle resulting from the pinch operation, an angle formed by a straight line connecting the two touch positions and one of two orthogonal coordinate axes of a coordinate system of the touch pad; and an adjustment amount change unit that changes an adjustment amount for the set size per operation in accordance with whether the pinch operation angle falls within a first angular range or a second angular range that does not overlap the first angular range.

28 Claims, 18 Drawing Sheets

X-direction operation

Y-direction operation

Oblique operation

X-direction operation

Y-direction operation

Oblique operation

IMAGE FORMING APPARATUS AND STORAGE MEDIUM

CROSS-REFERENCE TO RELATED APPLICATIONS

This application is based on application No. 2015-129794 filed in Japan, the contents of which are hereby incorporated by reference.

BACKGROUND OF THE INVENTION (1) Field of the Invention

The present invention relates to an image forming apparatus and a non-transitory computer-readable storage medium, and particularly to an art of causing a user to efficiently set the size of a non-standard size sheet by a pinch operation.

(2) Related Art

Conventionally, in an image forming apparatus including a manual feed tray, recording sheets of users' desired various sizes have been placed on the manual feed tray. The size of a placed recording sheet is set for example by a user via an operation panel. In this case, it is more preferable to cause the user to freely set the size than to cause the user to select the size among predetermined sizes. Also, a touch panel has been recently often adopted as an operation panel. For this reason, it is further preferable to cause the user to set the size by a touch operation.

According to the size change of a manually-fed sheet from the maximum size to the minimum size by a single touch operation, however, it is difficult to finely adjust the size in units of, for example, 0.1 mm. Also, in the case for example where a size adjustment amount per touch operation is set to a small value, it is possible to finely adjust the size. However, touch operations need to be repeated again and again in order to largely change the size, and this decreases the operability.

Further, although there is considered a method of switching the size adjustment amount by another button, the operability is also decreased because the other button needs to be operated between touch operations.

In response to these problems, for example in an image forming apparatus that causes a user to set the size of an image by a pinch operation and prints the image on a recording sheet, there has been proposed a device that increases or decreases the image size to a standard size by causing the user to quickly increase or decrease the distance between two touch positions at which a touch is made by his two fingers performing a pinch operation (see for example Japanese Patent Publication Application No. 2012-121179). By applying this proposal to the sheet size setting and increasing the speed of the pinch operation, it is possible to set the sheet size to the standard size.

SUMMARY OF THE INVENTION

However, the speed of the pinch operation differs between users. Also, each user has no choice but to actually repeat the pinch operation to find the threshold value of the speed of the pinch operation. Therefore, it is difficult to apply the above conventional art to the size setting.

The present invention was made in view of the above problems, and aims to provide an image forming apparatus and a non-transitory computer-readable storage medium that causes a user to efficiently set the size of non-standard size sheets in detail by the pinch operation.

In order to achieve the above aim, one aspect of the present invention provides an image forming apparatus comprising: a detection unit that detects a pinch operation that is an operation of increasing or decreasing a distance between two touch positions on a touch panel; an adjustment unit that, upon reception of setting of a size of a non-standard size sheet, adjusts the set size in accordance with the pinch operation; an angle specification unit that specifies, as a pinch operation angle resulting from the pinch operation, an angle formed by a straight line connecting the two touch positions and one of two orthogonal coordinate axes of a coordinate system of the touch pad; and an adjustment amount change unit that changes an adjustment amount for the set size per operation in accordance with whether the pinch operation angle falls within a first angular range or a second angular range that does not overlap the first angular range.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings.

DESCRIPTION OF PREFERRED EMBODIMENTS

The following explains embodiments of an image forming apparatus and a non-transitory computer-readable storage medium relating to the present invention, with reference to the drawings.

[1] Embodiment 1

An image forming apparatus relating to Embodiment 1 of the present invention is characterized by switching an adjustment amount A for the size per pinch operation, in accordance with whether or not a direction in which the distance between two touch positions on a touch panel increases or decreases by a pinch operation (a direction in which a user increases or decreases the distance between the touch positions at which a touch is made by his two fingers) is an oblique direction. This allows the user to efficiently perform size setting with no troublesome panel operation.

(1) Configuration of Image Forming Apparatus

Firstly, explanation is given on the configuration of an image forming apparatus relating to the present embodiment.

Figure 1:
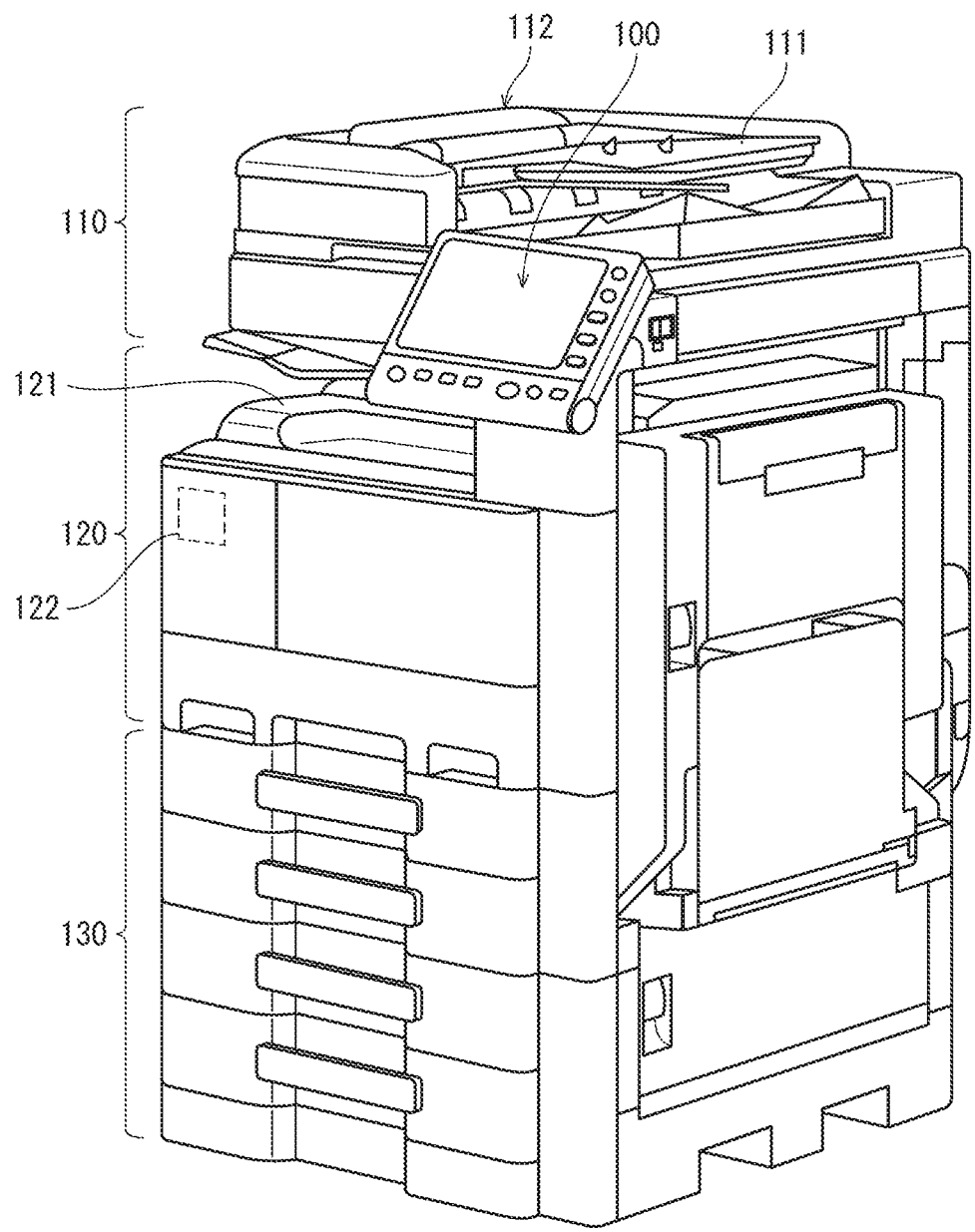
FIG. 1 is an external perspective view showing the main configuration of an image forming apparatus relating to Embodiment 1 of the present invention.
Figure 2:
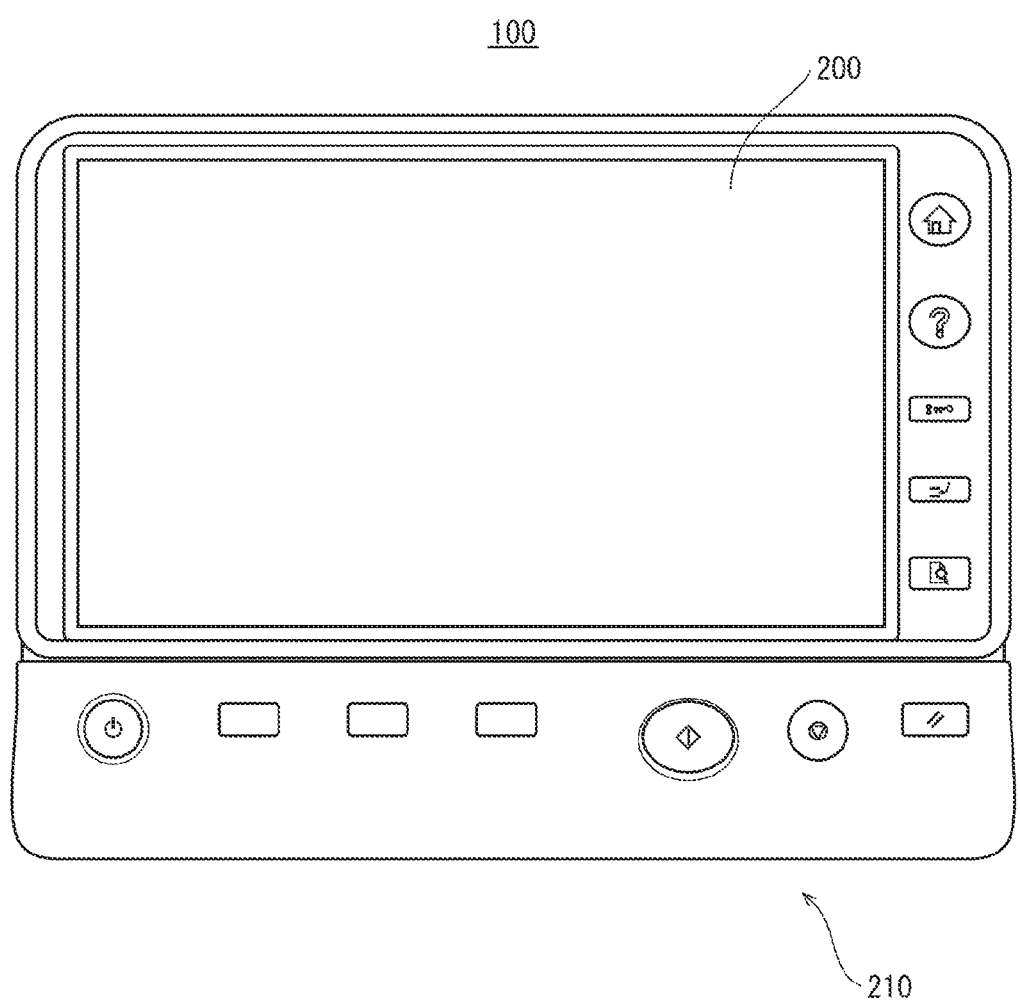
FIG. 2 is an external perspective view showing the main configuration of an operation panel 100.

As shown in FIG. 1, an image forming apparatus 1 is a so-called color multi-function peripheral (MFP), and includes a scanner 110 as an image input device, a printer 120 as an image output device, a paper feed unit 130, and an operation panel 100. As shown in FIG. 2, the operation panel 100 includes a touch panel 200 and hardware keys 210. The image forming apparatus 1 displays information to a user, receives a user input instruction, and so on via the operation panel 100. The scanner 110 conveys documents stacked on a document tray 111 piece by piece with use of an automatic document feeder (ADF) 112, and scans an image to generate digital image data.

In accordance with an input instruction via the operation panel 100, an image formation job received from other device such as a personal computer (PC) via a network (not illustrated) such as a local area network (LAN), or the like, the printer 120 forms a toner image with use of image data generated by the scanner 110, image data received from the other device, or the like. The formed toner image is transferred onto a recording sheet, which is fed by the paper feed unit 130, and is thermally fixed, and then is ejected onto a paper exit tray 121.

Figure 3:
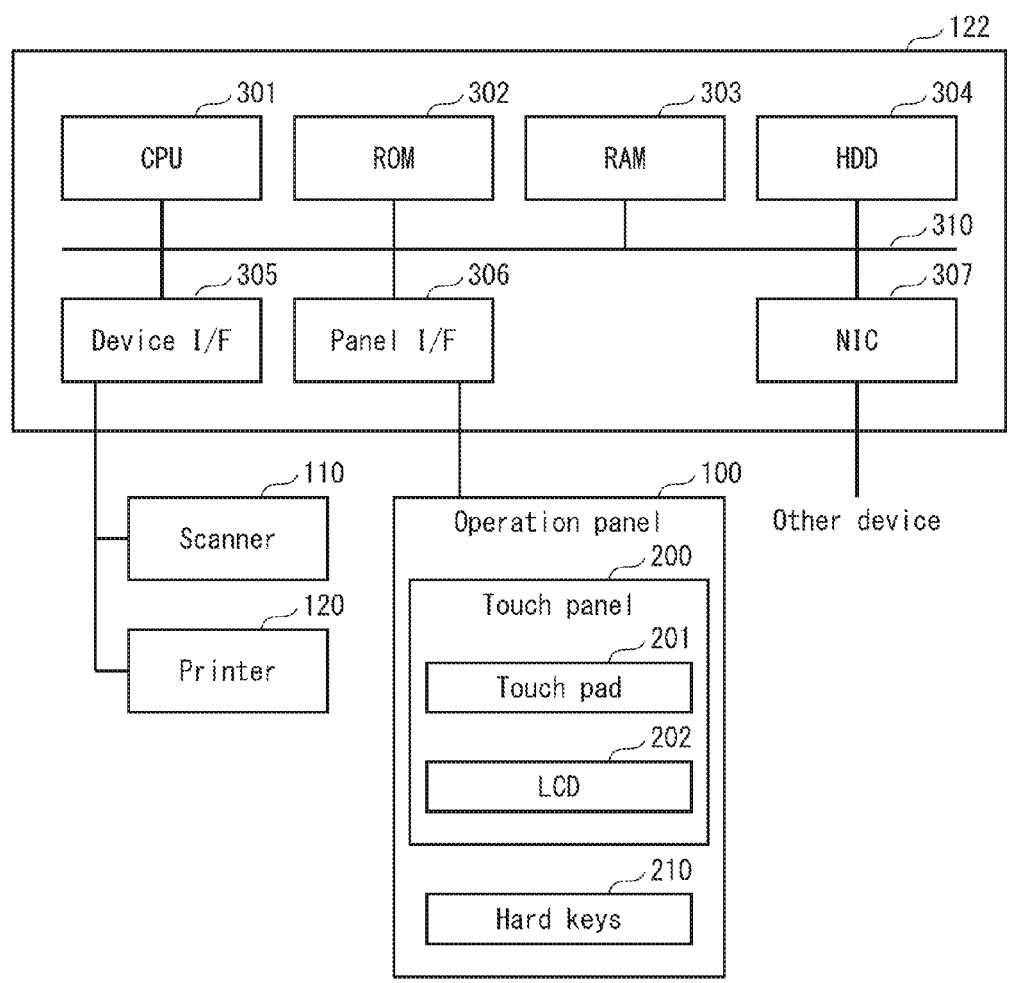
FIG. 3 is a block diagram showing the main hardware configuration of a controller 122.

The printer 120 includes therein a controller 122 that controls operations of the components of the image forming apparatus 1. As shown in FIG. 3, the controller 122 includes a central processing unit (CPU) 301, a read only memory (ROM) 302, and so on.

Upon power-on of the image forming apparatus 1, in the controller 122, the CPU 301 reads a boot program from the ROM 302 via a system bus 310, and executes an operating system (OS), a control program, and so on read from a hard disk drive (HDD) 304 with use of a random access memory (RAM) 303 as a storage region for work. The HDD 304 also stores therein user information, an address book, setting data of the image forming apparatus 1, and so on.

The CPU 301 communicates with other device with use of a network interface card (NIC) 307 via a network such as the LAN. Also, the controller 122 controls operations of the scanner 110, the printer 120, and so on via a device interface 305.

A panel interface 306 is an interface via which the CPU 301 accesses the operation panel 100. The operation panel 100 includes the touch panel 200 and the hardware keys 210. The touch panel 200 includes a touch pad 201 and a liquid crystal display (LCD) 202.

With the above configuration, the CPU 301 reads, from the HDD 304, image data of a sheet size setting screen 7 through which the user sets the sheet size of a manually fed sheet, and displays the image data on the LCD 202. Then, the CPU 301 detects a pinch operation of the user for setting the sheet size via the touch pad 201, and receives setting of the sheet size.

(2) Functional Configuration of Controller 122

Next, explanation is given on the functional configuration of the controller 122.

Figure 4:
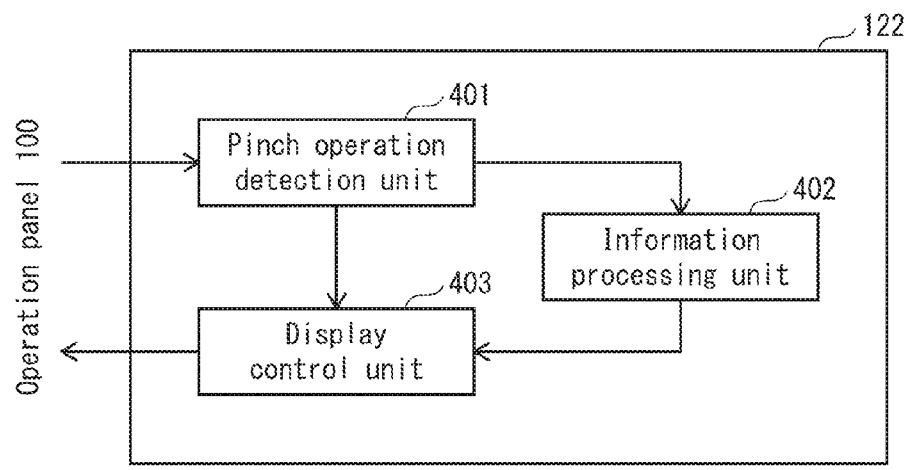
FIG. 4 is a block diagram showing the main functional configuration of the controller 122.

As shown in FIG. 4, the controller 122 includes a pinch operation detection unit 401, an information processing unit 402, and a display control unit 403. The pinch operation detection unit 401 detects a pinch operation on the sheet size setting screen 7. The information processing unit 402 calculates an angle resulting from the pinch operation detected by the pinch operation detection unit 401 (hereinafter, referred to as a pinch operation angle), and switches an adjustment amount A in accordance with the pinch operation angle. The pinch operation angle indicates an angle formed by a straight line connecting two touch positions resulting from the pinch operation and one of the coordinate axes of the touch pad 201. Also, the adjustment amount A includes an adjustment amount Ax in the X direction and an adjustment amount Ay in the Y direction.

Figure 5:
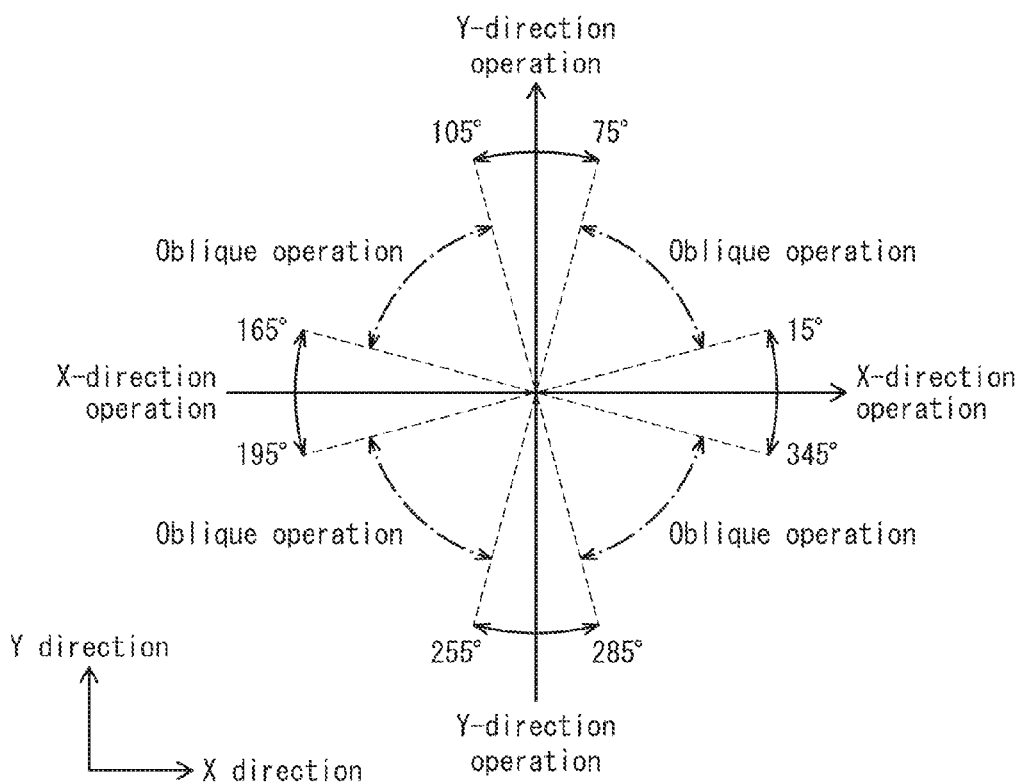
FIG. 5 exemplifies an angular range of a pinch operation.

In the case where the pinch operation angle is ±α threshold value in the X direction of the touch pad 201, the adjustment amount Ax is finely set and the adjustment amount Ay is set to 0 mm. In the present embodiment, the threshold value is set to 15 degrees, and in the case where the pinch operation angle falls within an angular range of −15 degrees (345 degrees) to 15 degrees or an angular range of 165 degrees to 195 degrees as shown in FIG. 5, the adjustment amount Ax is finely set, and the adjustment amount Ay is set to 0 mm. In the present embodiment, the pinch operation having the pinch operation angle within either of the above angular ranges is hereinafter referred to as an X-direction operation, and the adjustment amount Ax for the set sheet length is set to 0.1 mm.

In the case where the pinch operation angle is ±α threshold value in the Y direction of the touch pad 201, the adjustment amount Ax is set to 0 mm, and the adjustment amount Ay is finely set. In the present embodiment, the threshold value is set to 15 degrees, and in the case where the pinch operation angle falls within an angular range of 75 degrees to 105 degrees or an angular range of 255 degrees to 285 degrees, the adjustment amount Ax is set to 0 mm, and the adjustment amount Ay is finely set. In the present embodiment, the pinch operation having the pinch operation angle within either of the above angular ranges is hereinafter referred to as a Y-direction operation, and the adjustment amount Ay for the set sheet width is set to 0.1 mm.

Also, in the case where the pinch operation angle is out of the above angular ranges, specifically, in the present embodiment, in the case where the pinch operation angle falls within an angular range of 15 degrees to 75 degrees, an angular range of 105 degrees to 165 degrees, an angular range of 195 degrees to 255 degrees, or an angular range of 285 degrees to 345 degrees, both the adjustment amounts Ax and Ay are roughly set. In the present embodiment, the pinch operation having the pinch operation angle within either of the above angular ranges is hereinafter referred to as an oblique operation, and both the adjustment amount Ax for the set sheet length and the adjustment amount Ay for the set sheet width are each set to 100.0 mm.

In the present embodiment, each time one pinch operation is performed, the set sheet size is changed by the adjustment amount. Specifically, each time one X-direction operation is performed, the set sheet length is changed by 0.1 mm. Each time one Y-direction operation is performed, the set sheet width is changed by 0.1 mm. Each time one oblique operation is performed, the set sheet length and the set sheet width are each changed by 100.0 mm.

A pinch-out operation that is a pinch operation of increasing the distance between touch positions of two fingers (hereinafter, referred to as an enlargement operation) increases the set sheet size by the adjustment amounts Ax and Ay. A pinch-in operation that is a pinch operation of decreasing the distance between touch positions of two fingers (hereinafter, referred to as a reduction operation) decreases the set sheet size by the adjustment amounts Ax and Ay.

The display control unit 403 changes display of the set sheet size on the operation panel 100 in accordance with the adjustment amount A switched by the information processing unit 402 and the pinch operation detected by the pinch operation detection unit 401.

(3) Operations of Controller 122

Figure 6:
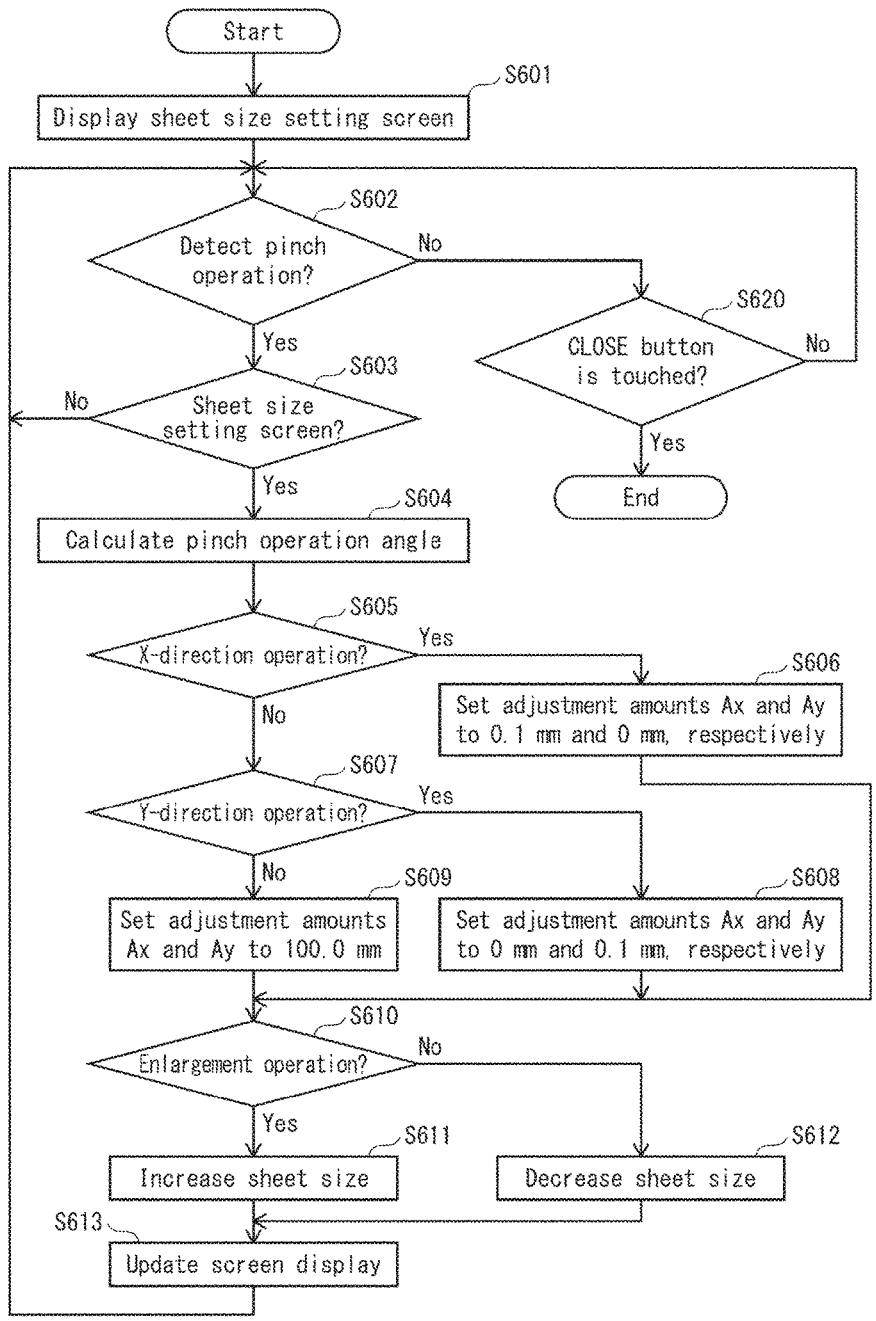
FIG. 6 is a flow chart showing the main operations of the controller 122.

Next, explanation is given on the operations of the controller 122 with reference to a flow chart in FIG. 6.

In setting of the sheet size, the controller 122 firstly displays the sheet size setting screen 7 (S601). As exemplified in FIG. 7, the sheet size setting screen 7 includes a pinch operation reception region 700 on the right side thereof and a sheet size display region 710 on the left side thereof. The pinch operation reception region 700 is a region for receiving setting of the sheet size by the pinch operation, and the sheet size display region 710 is a region for displaying the set sheet size.

When a pinch operation is performed on the pinch operation reception region 700, the set sheet size is adjusted by the adjustment amounts Ax and Ay in accordance with a pinch operation angle. A rectangle 701, which has the size in accordance with the set sheet size, is displayed on the pinch operation reception region 700. When the set sheet size is changed, the size of the rectangle 701 is accordingly changed.

The sheet size display region 710 has an XY-direction explanation diagram 711, a sheet length display region 720, and a sheet width display region 730. On the XY-direction explanation diagram 711, a manual feed tray 712, a sheet 713, and letters X and Y 714, which indicate the X and Y directions, respectively, are displayed.

On the sheet length display region 720, the set sheet length (the set size in the X direction, 457.2 mm in FIG. 7) is displayed. Together with this, the upper limit value 457.2 mm and the lower limit value 139.7 mm of the settable sheet length are displayed in FIG. 7. On the sheet width display region 730, the set sheet width (the set size in the Y direction, 311.1 mm in FIG. 7) is displayed. Together with this, the upper limit value 320.0 mm and the lower limit value 90.0 mm of the settable sheet width are displayed in FIG. 7.

When a CLOSE button 740 is touched, the size setting processing ends.

Returning to FIG. 6, when the pinch operation detection unit 401 detects a pinch operation received in the pinch operation reception region 700 (S602: Yes), the information processing unit 402 checks whether or not the currently displayed screen is the sheet size setting screen 7. In the case where the currently displayed screen is the sheet size setting screen 7 (S603: Yes), the information processing unit 402 calculates a pinch operation angle (S604).

Figure 8:
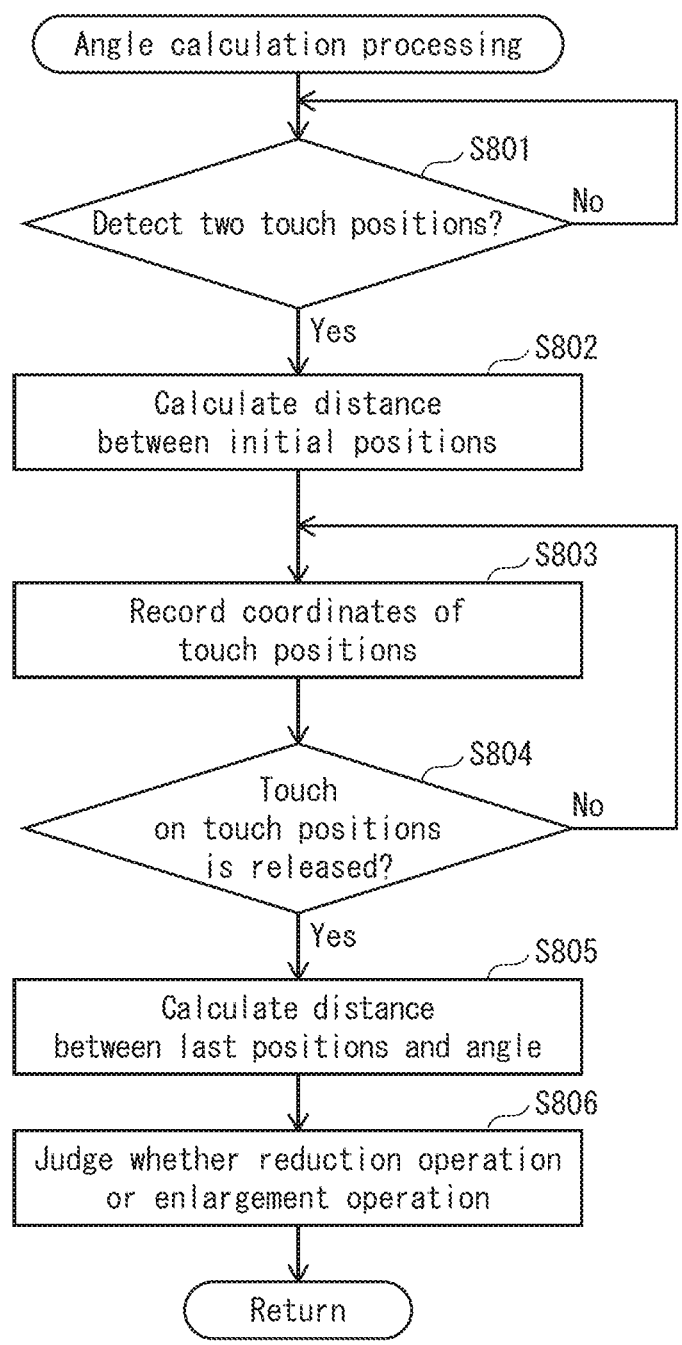
FIG. 8 is a flow chart showing processing of calculating a pinch operation angle.

The pinch operation angle is calculated for example as shown in FIG. 8. Firstly, when the status of the touch panel 200 shifts from a state where one or less position is touched to a state where two positions are touched, the pinch operation detection unit 401 detects the two touch positions (S801: Yes). Then, the information processing unit 402 calculates as follows a distance $D_1$ between the two touch positions as the initial positions (S802).

$$D_1 = \{(x_{11} - x_{12})^2 + (y_{11} - y_{12})^2\}^{1/2} \quad (1)$$

Here, $(x_{11}, y_{11})$ and $(x_{12}, y_{12})$ represent the coordinates on the initial positions.

Then, the pinch operation detection unit 401 monitors output of the touch pad 201, and repeatedly records the coordinates of the two touch positions (S803) until touch on the two touch positions is released (S804: No). When the touch on the touch positions is released (S804: Yes), the information processing unit 402 judges that the pinch operation has ended, and calculates as follows a distance $D_2$ between the two touch positions as the last positions whose coordinates have been lastly recorded, and calculates a pinch operation angle θ (S805).

$$D_2 = \{(x_{21} - x_{22})^2 + (y_{21} - y_{22})^2\}^{1/2} \quad (2)$$

$$\theta = \cos^{-1}\{(x_{21} - x_{22})/D_2\} \quad (3)$$

Here, $(x_{21}, y_{21})$ and $(x_{22}, y_{22})$ represent the coordinates on the last positions.

Finally, the information processing unit 402 compares the calculated distances $D_1$ and $D_2$. In the case where the distance $D_1$ between the initial positions is larger than the distance $D_2$ between the last positions, the information processing unit 402 judges that the pinch operation is a reduction operation, and otherwise judges that the pinch operation is an enlargement operation (S806), and then the processing ends.

Returning to FIG. 6, in the case where the pinch operation is an X-direction operation (S605: Yes), the information processing unit 402 sets the adjustment amounts Ax and Ay to 0.1 mm and 0 mm, respectively (S606). Also, in the case where the pinch operation is a Y-direction operation (S607: Yes), the information processing unit 402 sets the adjustment amounts Ax and Ay to 0 mm and 0.1 mm, respectively (S608). Further, in the case where the pinch operation is an oblique operation (S607: No), the information processing unit 402 sets both the adjustment amounts Ax and Ay to 100.0 mm (S609).

In the case where the pinch operation is an enlargement operation (S610: Yes), the information processing unit 402 increases the set sheet size in the X and Y directions by the adjustment amounts Ax and Ay, respectively (S611). Also, in the case where the pinch operation is a reduction operation (S610: No), the information processing unit 402 decreases the set sheet size in the X and Y directions by the adjustment amounts Ax and Ay, respectively (S612).

Figure 9A:
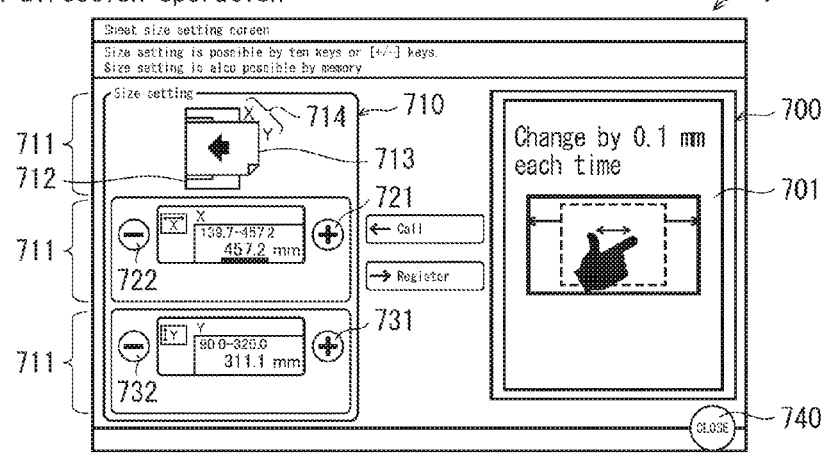
FIG. 9A exemplifies a size setting operation in an X direction.
Figure 9B:
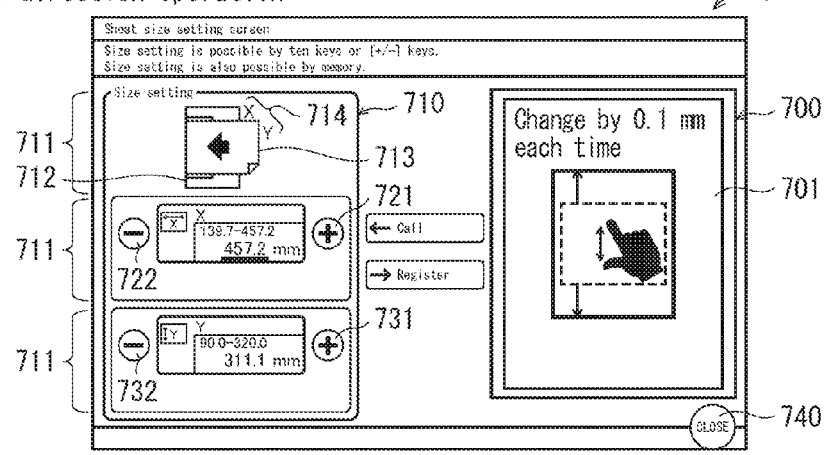
FIG. 9B exemplifies a size setting operation in a Y direction.
Figure 9C:
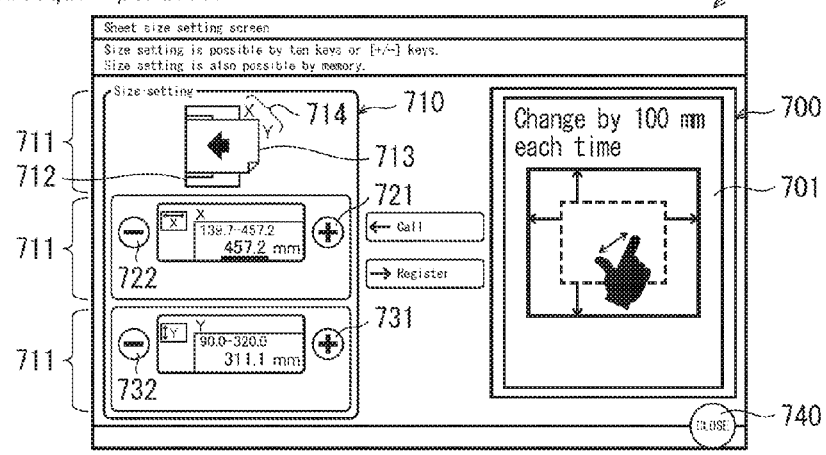
FIG. 9C exemplifies a size setting operation in an oblique direction.

In the case for example where the pinch operation is an X-direction operation, the set sheet size is increased or decreased in the X direction by 0.1 mm as shown in FIG. 9A. Also, in the case where the pinch operation is a Y-direction operation, the set sheet size is increased or decreased in the Y direction by 0.1 mm as shown in FIG. 9B. Further, in the case where the pinch operation is an oblique operation, the set sheet size is increased or decreased in both the X and Y directions by 100.0 mm as shown in FIG. 9C.

Finally, the information processing unit 402 changes the size of the rectangle 701 displayed on the pinch operation reception region 700 in accordance with the set sheet size after change (S613). Together with this, the information processing unit 402 updates the set sheet length displayed on the sheet length display region 720 and the set sheet width displayed on the sheet width display region 730.

After completion of Step S613, the flow proceeds to Step S602. In the case where no pinch operation is detected (S602: No) and the CLOSE button 740 is touched (S620: Yes), the size setting processing ends.

With this configuration, it is possible to switch the adjustment amounts Ax and Ay in accordance with the pinch operation angle, thereby enabling the user to efficiently set the size of non-standard size sheets by the pinch operation.

[2] Embodiment 2

Next, explanation is given on Embodiment 2 of the present invention. An image forming apparatus relating to the present embodiment has basically the common configuration with the above image forming apparatus relating to Embodiment 1. However, the image forming apparatus relating to the present embodiment displays the adjustment amounts Ax and Ay on the pinch operation reception region 700 of the sheet size setting screen 7. This is the difference from the image forming apparatus relating to Embodiment 1. The following explanation is given focusing on the difference.

Note that the same reference numerals are appended to the common elements in the different embodiments.

Figure 10:
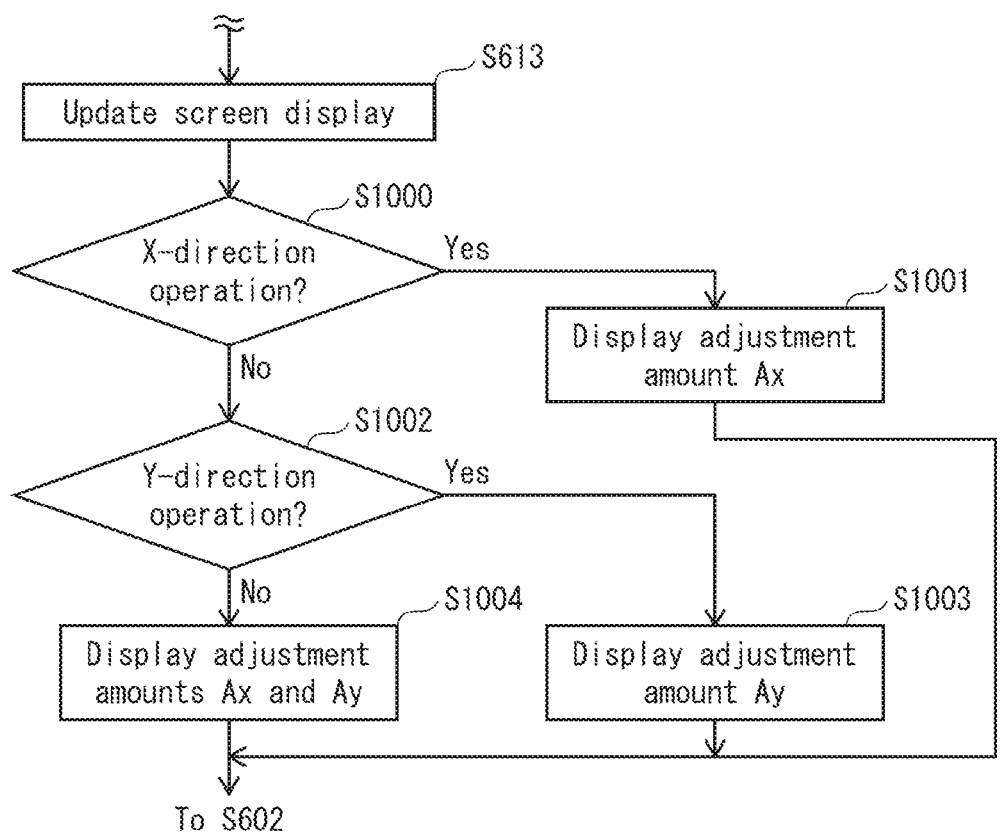
FIG. 10 is a flow chart showing operations of the controller 122 relating to Embodiment 2 of the present invention.
Figure 11A:
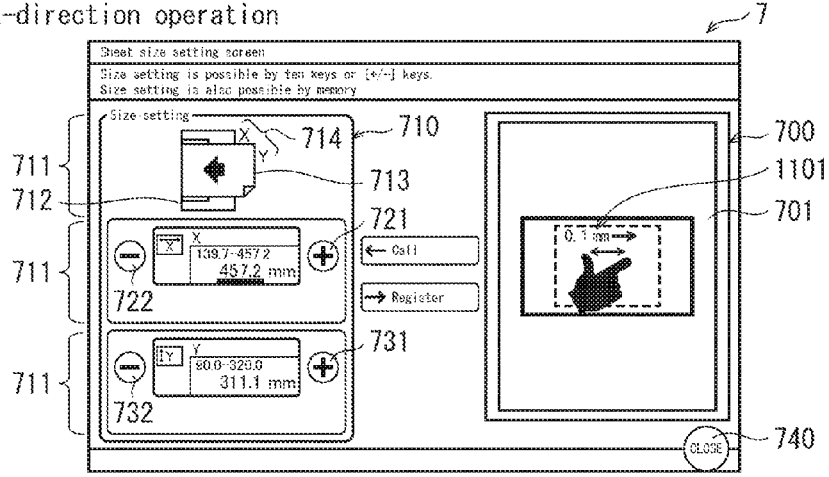
FIG. 11A exemplifies a sheet size setting screen 7 on which an adjustment amount by an X-direction operation is displayed.

FIG. 10 is a flow chart showing operations of the controller 122 relating to the present embodiment in addition to the operations of the controller 122 relating to the above Embodiment 1 shown in FIG. 6. As shown in FIG. 10, after execution of Step S613, in the case where the pinch operation is an X-direction operation (S1000: Yes), the controller 122 displays the adjustment amount Ax and an arrow 1101 indicating the X direction on the pinch operation reception region 700 of the sheet size setting screen 7 as shown in FIG. 11A (S1001).

Figure 11B:
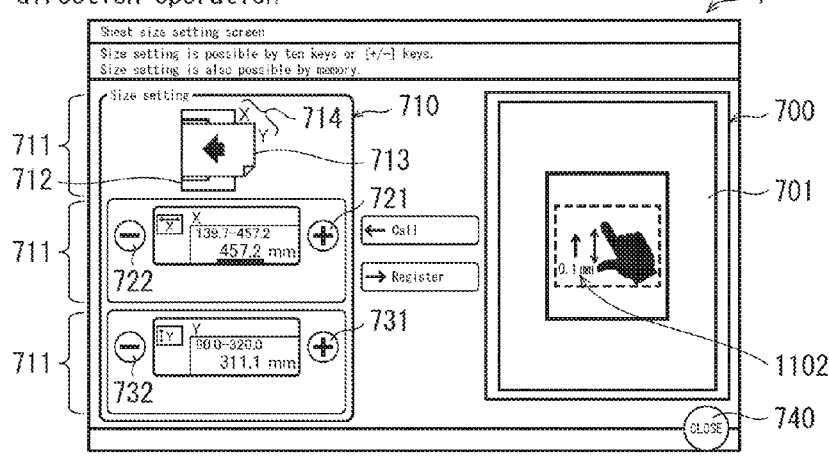
FIG. 11B exemplifies the sheet size setting screen 7 on which an adjustment amount by a Y-direction operation is displayed.
Figure 11C:
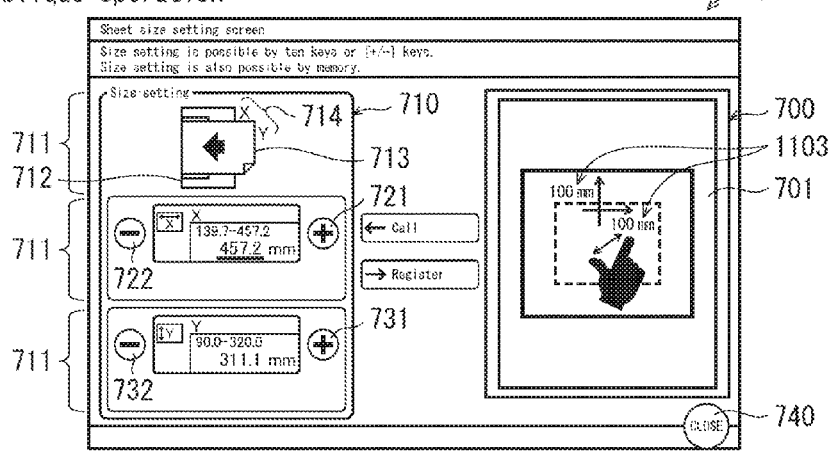
FIG. 11C exemplifies the sheet size setting screen 7 on which an adjustment amount by an oblique operation is displayed.

In the case where the pinch operation is a Y-direction operation (S1002: Yes), the controller 122 displays the adjustment amount Ay and an arrow 1102 indicating the Y direction on the pinch operation reception region 700 of the sheet size setting screen 7 as shown in FIG. 11B (S1001). Also, in the case where the pinch operation is an oblique operation (S1002: No), the controller 122 displays both the adjustment amounts Ax and Ay and an arrow 1103 indicating both the X and Y directions on the pinch operation reception region 700 of the sheet size setting screen 7 as shown in FIG. 11C (S1001). Then, the flow proceeds to Step S602.

With this configuration, the user feels convenient to set the size while checking the adjustment amounts Ax and Ay.

[3] Embodiment 3

Next, explanation is given on Embodiment 3 of the present invention. An image forming apparatus relating to the present embodiment has basically the common configuration with the above image forming apparatus relating to Embodiment 1. However, in the case where at least one of the set sheet length and the set sheet width reaches the upper limit value or the lower limit value during size setting, the image forming apparatus relating to the present embodiment prohibits the size setting. This is the difference from the image forming apparatus relating to Embodiment 1. The following explanation is given focusing on the difference.

Figure 12:
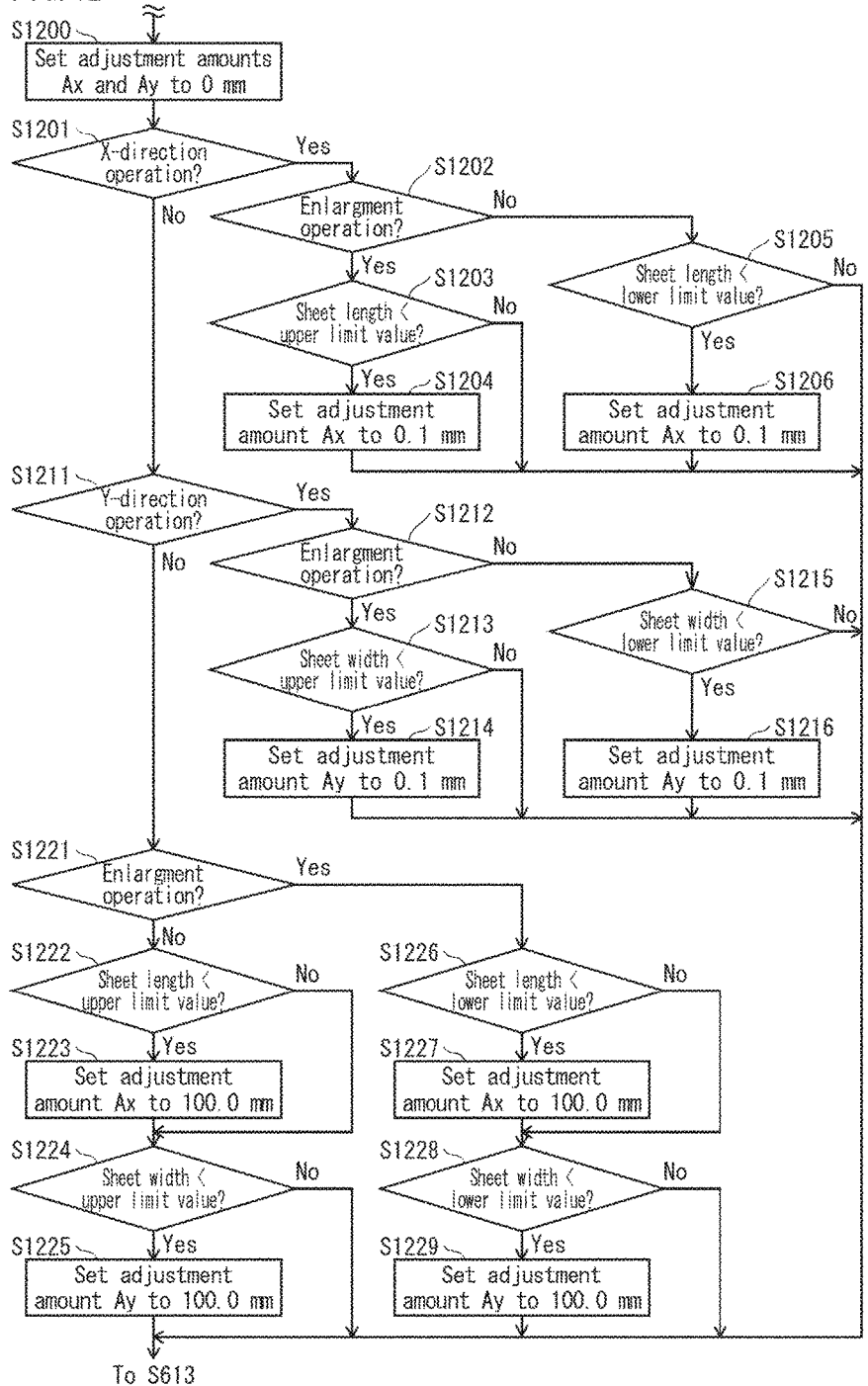
FIG. 12 is a flow chart showing operations of the controller 122 relating to Embodiment 3 of the present invention.

FIG. 12 is a flow chart showing operations of the controller 122 relating to the present embodiment instead of part of the operations (Steps S605-S609) of the controller 122 relating to the above Embodiment 1 shown in FIG. 6. As shown in FIG. 12, after executing Step S604, the controller 122 sets both the adjustment amounts Ax and Ay to 0 mm (S1200).

In the case where the pinch operation is an X-direction operation (S1201: Yes), the controller 122 checks whether the pinch operation is an enlargement operation or a reduction operation. In the case where the pinch operation is an enlargement operation (S1202: Yes), the controller 122 refers to the current set sheet length. In the case where the set sheet length is less than the upper limit value (S1203: Yes), the controller 122 sets the adjustment amount Ax to 0.1 mm (S1204).

Figure 7:
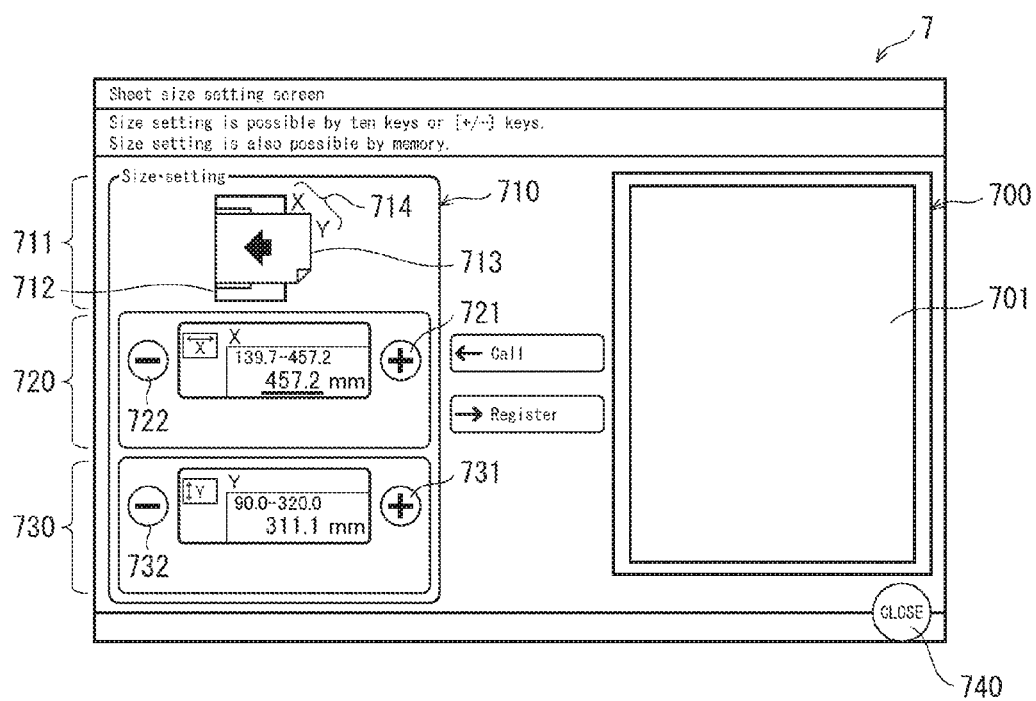
FIG. 7 exemplifies a sheet size setting screen.

Also in the case where the pinch operation is a reduction operation (S1202: No) and the set sheet length is larger than the lower limit value (S1205: Yes), the controller 122 sets the adjustment amount Ax to 0.1 mm (S1206). In the present embodiment, the upper limit value and the lower limit value of the settable sheet length are 457.2 mm and 139.7 mm, respectively as shown in FIG. 7.

In the case where the pinch operation is a Y-direction operation (S1211: Yes), the controller 122 checks whether the pinch operation is an enlargement operation or a reduction operation. In the case where the pinch operation is an enlargement operation (S1212: Yes), the controller 122 refers to the current set sheet length. In the case where the set sheet length is less than the upper limit value (S1213: Yes), the controller 122 sets the adjustment amount Ay to 0.1 mm (S1214).

Also in the case where the pinch operation is a reduction operation (S1212: No) and the set sheet width is larger than the lower limit value (S1215: Yes), the controller 122 sets the adjustment amount Ay to 0.1 mm (S1216). In the present embodiment, the upper limit value and the lower limit value of the settable sheet width are 320.0 mm and 90.0 mm, respectively.

Also in the case where the pinch operation is an oblique operation (S1211: No) and an enlargement operation (S1221: Yes), the controller 122 refers to the current set sheet length. In the case where the set sheet length is less than the upper limit value (S1222: Yes), the controller 122 sets the adjustment amount Ax to 100.0 mm (S1223). Also, the controller 122 refers to the current set sheet width. In the case where the set sheet width is less than the upper limit value (S1224: Yes), the controller 122 sets the adjustment amount Ay to 100.0 mm (S1225).

In the case where the pinch operation is a reduction operation (S1221: No) and the set sheet length is larger than the lower limit value (S1222: Yes), the controller 122 sets the adjustment amount Ax to 100.0 mm (S1223). Also, the controller 122 refers to the current set sheet width. In the case where the set sheet width is less than the upper limit value (S1224: Yes), the controller 122 sets the adjustment amount Ay to 100.0 mm (S1225).

Then, the flow proceeds to Step S613 and the above processing is repeated.

Figure 13:
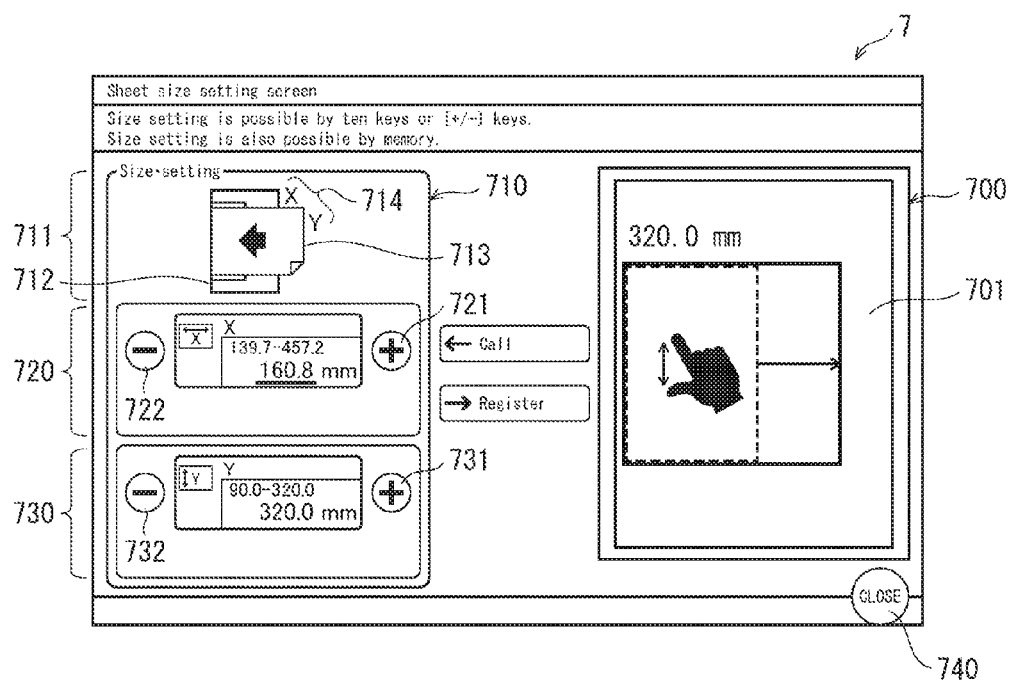
FIG. 13 exemplifies the sheet size setting screen 7 in the case where size setting is restricted.

FIG. 13 exemplifies the sheet size setting screen 7 in the case where size setting is restricted. As shown in FIG. 13, in the case where the set sheet width reaches 320.0 mm, which is the upper limit value, the adjustment amount Ay is kept at 0 mm set in Step S1200 even after an enlargement operation in the Y direction is performed (S1212: Yes). This is because the set sheet width has reached the upper limit value (S1213: No). Accordingly, since the adjustment amount Ay is 0 mm, the enlargement operation does not increase the set sheet width.

On the other hand, in the case where a reduction operation in the Y direction is performed (S1212: No), the adjustment amount Ay is set to 0.1 mm unless the set sheet width reaches the lower limit value (S1215: Yes) irrespective of whether or not the set sheet width reaches the upper limit value. Accordingly, the set sheet width is decreased.

Also, the set sheet length in the X direction reaches neither the upper limit value nor the lower limit value. Accordingly, both in the case where the pinch operation is an X-direction operation and an enlargement operation and in the case where the pinch operation is an X-direction operation and a reduction operation, the adjustment amount Ax is set to 0.1 mm. Further, in the case where the pinch operation is an oblique operation, the adjustment amount Ax is set to 100.0 mm.

With this configuration, it is possible to prohibit setting of the sheet size when the set sheet size reaches the upper limit value or the lower limit value.

[4] Embodiment 4

Next, explanation is given on Embodiment 4 of the present invention. An image forming apparatus relating to the present embodiment has basically the common configuration with the above image forming apparatus relating to Embodiment 1. However, the image forming apparatus relating to the present embodiment sets the sheet size by a button operation in addition to the pinch operation. This is the difference from the image forming apparatus relating to Embodiment 1. The following explanation is given focusing on the difference.

(1) Sheet Size Setting Screen

Firstly, explanation is given on the configuration of the sheet size setting screen 7.

As shown in FIG. 7, the sheet length display region 720 includes sheet size adjustment buttons 721 and 722. When the sheet size adjustment button 721 is touched, a displayed numerical value is increased. When the sheet size adjustment button 722 is touched, a displayed numerical value is decreased. In accordance with increase or decrease of the displayed numerical value, the set sheet length and the length of the rectangle 701 are also updated.

Also, the sheet width display region 730 includes similar sheet size adjustment buttons 731 and 732. When the sheet size adjustment button 731 is touched, a displayed numerical value is increased. When the sheet size adjustment button 732 is touched, a displayed numerical value is decreased. In accordance with increase or decrease of the displayed numerical value, the set sheet width and the width of the rectangle 701 are also updated.

In the present embodiment, the sheet size adjustment buttons 721, 722, 731, and 732 are used for fine adjustment of the set size. Each time the user touches any of these buttons, the set sheet length or the set sheet width is increased or decreased by 0.1 mm. Note that the adjustment amount is of course not limited to 0.1 mm.

(2) Operations of Controller 122

Next, explanation is given on the operations of the controller 122.

Figure 14:
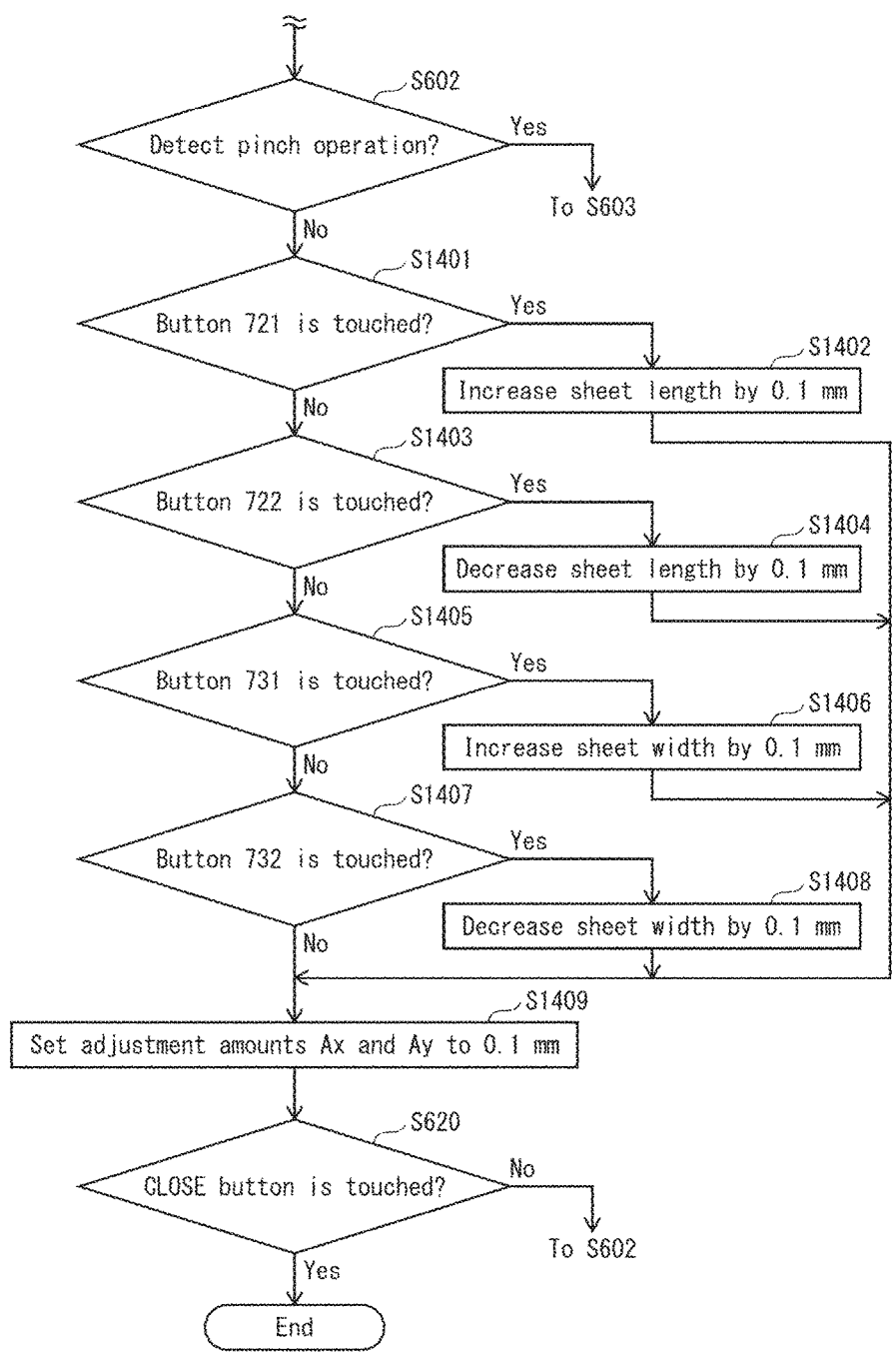
FIG. 14 is a flow chart showing operations of the controller 122 relating to Embodiment 4 of the present invention.

FIG. 14 is a flow chart showing, among operations of the controller 122 relating to the present embodiment, operations executed in addition to the operations shown in FIG. 6. As shown in FIG. 14, in the case where no pinch operation is detected (S602: No) and the sheet size adjustment button 721 is touched (S1401: Yes), the controller 122 increases the set sheet length by 0.1 mm (S1402).

Similarly, in the case where the sheet size adjustment button 722 is touched (S1403: Yes), the controller 122 decreases the set sheet length by 0.1 mm (S1404). In the case where the sheet size adjustment button 731 is touched (S1405: Yes), the controller 122 increases the set sheet width by 0.1 mm (S1406). In the case where the sheet size adjustment button 732 is touched (S1407: Yes), the controller 122 decreases the set sheet width by 0.1 mm (S1408).

Then, the controller 122 sets both the adjustment amounts Ax and Ay to 0.1 mm (S1409). In the case where the CLOSE button 740 is touched (S620: Yes), the size setting ends.

With this configuration, it is possible to further improve the operability of the sheet size setting screen. Also, since it is considered that the set size is finely adjusted by button operations, it is possible to allow the user to smoothly perform operations by automatically setting the adjustment amounts Ax and Ay to 0.1 mm.

[5] Embodiment 5

Next, explanation is given on Embodiment 5 of the present invention. An image forming apparatus relating to the present embodiment has basically the common configuration with the above image forming apparatus relating to Embodiment 1. However, the image forming apparatus relating to the present embodiment sets the print size of an overlaid image (hereinafter, referred to as an overlay print size) in addition to the sheet size. This is the difference from the image forming apparatus relating to Embodiment 1. The following explanation is given focusing on the difference.

(1) Overlay Setting Screen

Figure 15:
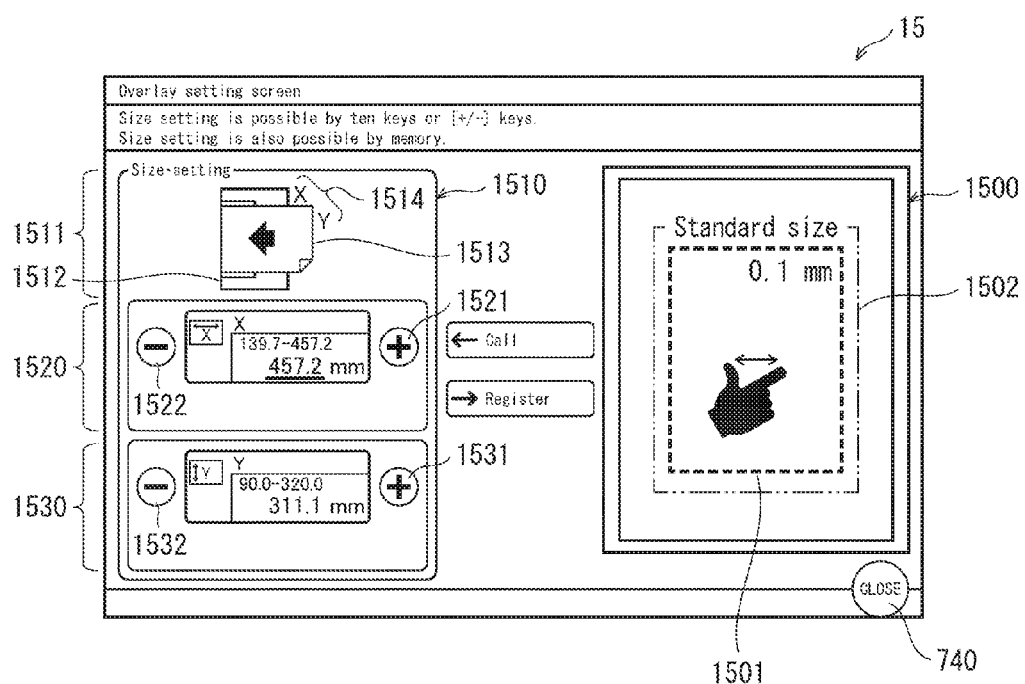
FIG. 15 exemplifies an overlay setting screen 15 relating to Embodiment 5 of the present invention.

As shown in FIG. 15, an overlay setting screen 15 relating to the present embodiment includes a reception region 1500 on the right side thereof and a display region 1510 on the left side thereof. The reception region 1500 is a region for receiving setting of the overlay print size. The display region 1510 is a region for displaying the set overlay print size. Further, a rectangle 1502, which is indicated by the chain double-dashed line, is displayed on the reception region 1500. The rectangle 1502 represents a standard size of sheets.

When the overlay setting screen 15 is displayed, an adjustment amount for the overlay print size is firstly set to the initial value, for example 100.0 mm. The rectangle 1502, which represents the standard size of sheets, is displayed on the reception region 1500. When the set overlay print size is changed by a pinch operation to a size that falls within a threshold range relative to any standard size, the adjustment amount for the set overlay print size is set to a value that is less than the initial value, for example 0.1 mm. Also, a rectangle 1501, which represents the set overlay print size, is displayed on the reception region 1500.

The display region 1510 has the same configuration as the sheet size display region 710 of the sheet size setting screen 7. Also, the CLOSE button 740 is displayed on the overlay setting screen 15 similarly to on the sheet size setting screen 7.

(2) Operations of Controller 122

Next, explanation is given on the operations of the controller 122.

Figure 16:
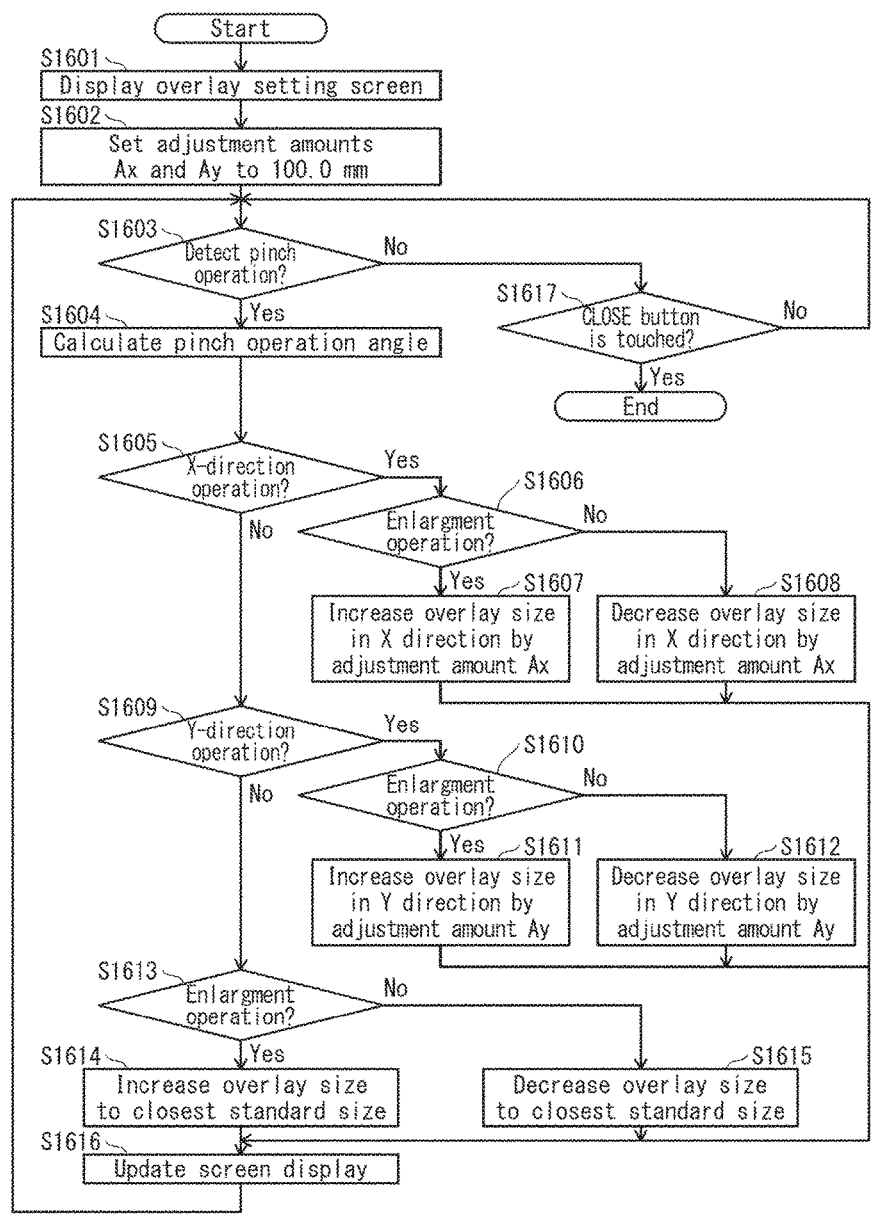
FIG. 16 is a flow chart showing operations of the controller 122 relating to Embodiment 5 of the present invention.

As shown in FIG. 16, the controller 122 displays the overlay setting screen 15 on the LCD 202 (S1601), and firstly initializes the adjustment amounts Ax and Ay to 100.0 mm (S1602). The adjustment amount Ax indicates an adjustment amount for the set overlay print size in the X direction (the sheet length direction). The adjustment amount Ay indicates an adjustment amount for the set overlay print size in the Y direction (the sheet width direction).

Then, when detecting a pinch operation received in the reception region 1500 (S1603: Yes), the controller 122 calculates a pinch operation angle (S1604). In the case where the pinch operation is an X-direction operation (S1605: Yes) and an enlargement operation (S1606: Yes), the controller 122 increases the set overlay print size in the X direction by the adjustment amount Ax (S1607). In the case where the pinch operation is an X-direction operation (S1605: Yes) and a reduction operation (S1606: No), the controller 122 decreases the set overlay print size in the X direction by the adjustment amount Ax (S1608).

Also, in the case where the pinch operation is a Y-direction operation (S1609: Yes) and an enlargement operation (S1610: Yes), the controller 122 increases the set overlay print size in the Y direction by the adjustment amount Ay (S1611). In the case where the pinch operation is a Y-direction operation (S1609: Yes) and a reduction operation (S1610: No), the controller 122 decreases the set overlay print size in the Y direction by the adjustment amount Ay (S1612).

Further, in the case where the pinch operation is an oblique operation (S1609: No) and an enlargement operation (S1613: Yes), the controller 122 increases the set overlay print size so as to be larger than the current set overlay print size and be a standard size that is the closest to the current overlay print size (S1614). In the case where the pinch operation is an oblique operation (S1609: No) and a reduction operation (S1613: No), the controller 122 decreases the overlay print size so as to be smaller than the current set overlay print size and be a standard size that is the closest to the current set overlay print size (S1615).

Then, the controller 122 updates display on the rectangle 1501 of the reception region 1500 in accordance with the adjusted overlay print size (S1616). The flow proceeds to Step S1603 and the above processing is repeated.

With this configuration, it is possible to facilitate the pinch operation for setting the overlay print size.

[6] Embodiment 6

Next, explanation is given on Embodiment 6 of the present invention. An image forming apparatus relating to the present embodiment has basically the common configuration with the above image forming apparatus relating to Embodiment 1. However, the image forming apparatus relating to the present embodiment causes the user to set the size of long sheets. This is the difference from the image forming apparatus relating to Embodiment 1. The following explanation is given focusing on the difference.

(1) Long Sheet Size Setting Screen

Firstly, explanation is given on a long sheet size setting screen.

Figure 17:
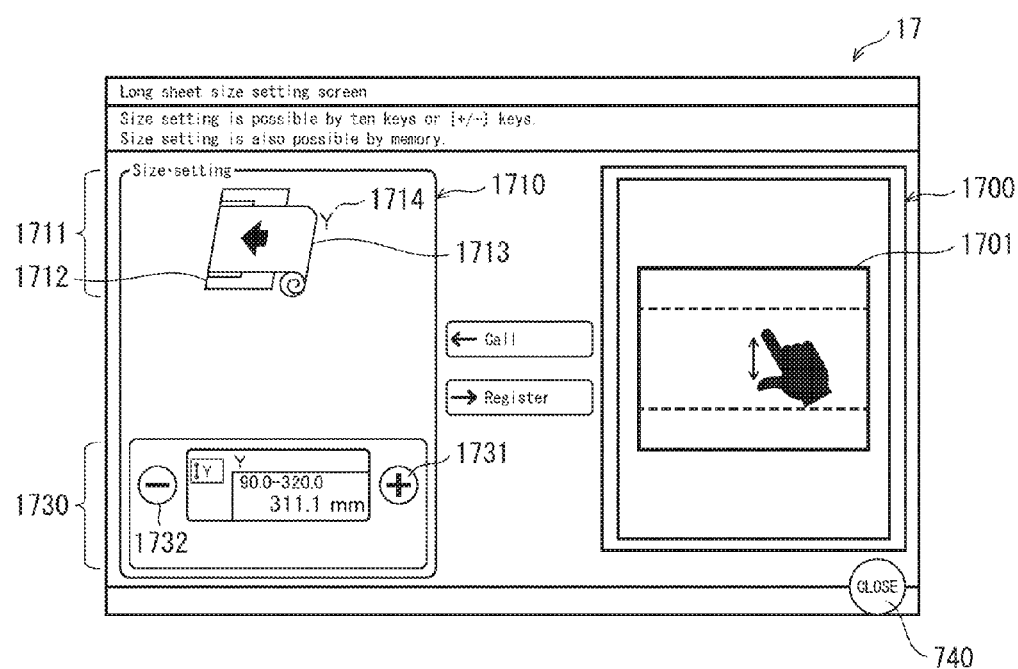
FIG. 17 exemplifies a long sheet size setting screen 17 relating to Embodiment 6 of the present invention.

The long sheet size setting screen is a screen for setting the sheet width of long sheets such as continuous sheets. As shown in FIG. 17, a long sheet size setting screen 17 includes a reception region 1700 on the right side thereof and a display region 1710 on the left side thereof. The reception region 1700 is a region for receiving a pinch operation, and the display region 1710 is a region for displaying the set sheet width.

Both in the case where a pinch operation received in reception region 1700 is an X-direction operation and in the case where the pinch operation received in reception region 1700 is a Y-direction operation, the sheet width is changed.

The display region 1710 has basically the same configuration as the sheet size display region 710 of the sheet size setting screen 7, but does not include the sheet length display region. Also, the CLOSE button 740 is displayed on the long sheet size setting screen 17 similarly to on the sheet size setting screen 7.

(2) Operations of Controller 122

Next, explanation is given on the operations of the controller 122.

Figure 18:
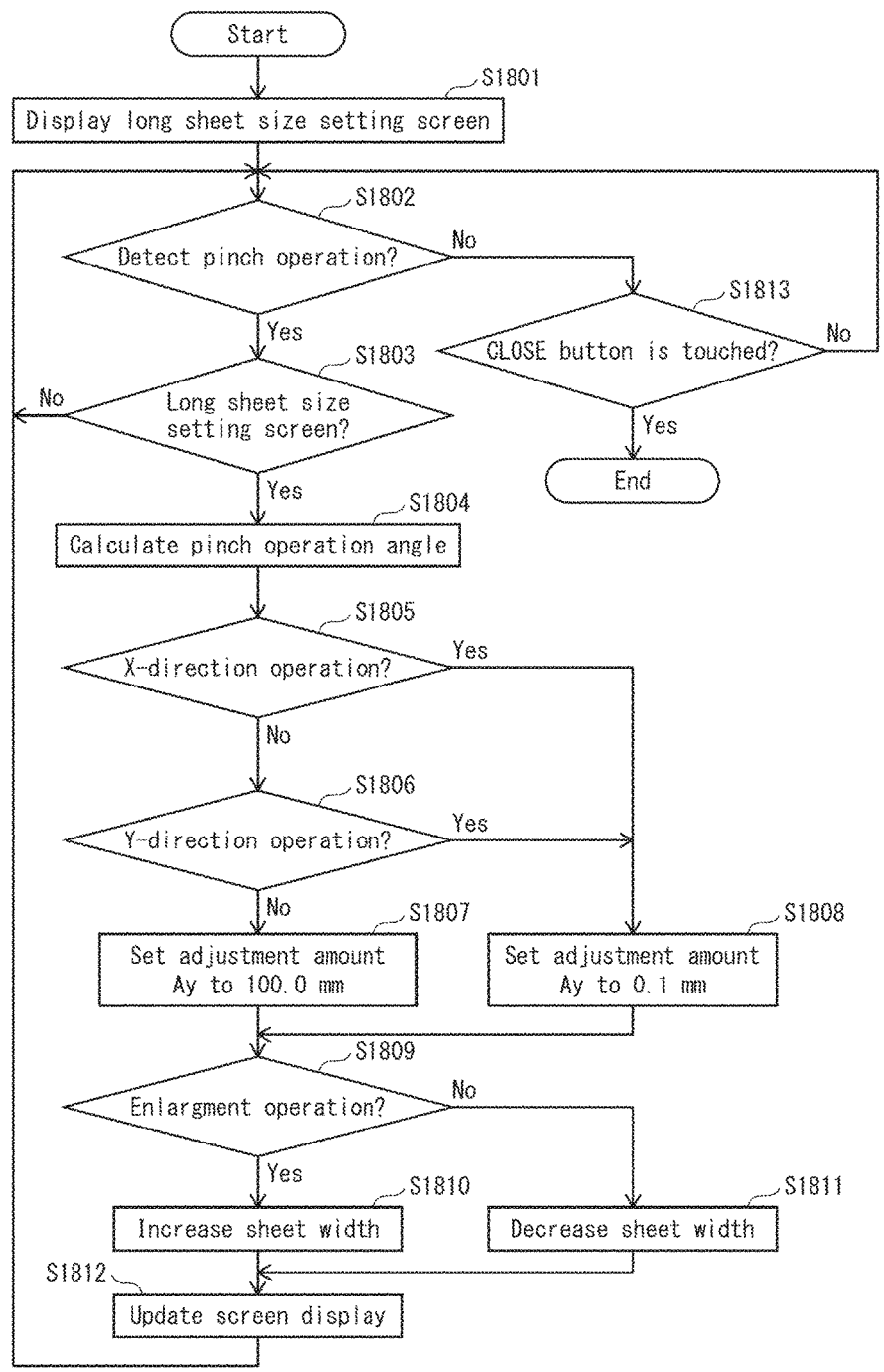
FIG. 18 is a flow chart showing operations of the controller 122 relating to Embodiment 6 of the present invention.

As shown in FIG. 18, the controller 122 firstly displays the long sheet size setting screen 17 on the LCD 202 (S1801). When the pinch operation detection unit 401 detects a pinch operation received in the reception region 1700 (S1802: Yes), the information processing unit 402 checks whether or not the currently displayed screen is the long sheet size setting screen 17. In the case where the currently displayed screen is the long sheet size setting screen 17 (S1803: Yes), the information processing unit 402 calculates a pinch operation angle (S1804).

In the case where the pinch operation is neither an X-direction operation nor a Y-direction operation (S1805: No and S1806: No), the information processing unit 402 sets the adjustment amount Ay to 100.0 mm (S1807). Also, in the case where the pinch operation is an X-direction operation (S1805: Yes) or a Y-direction operation (S1806: Yes), the information processing unit 402 sets the adjustment amount Ay to 0.1 mm (S1808).

In the case where the pinch operation is an enlargement operation (S1809: Yes), the information processing unit 402 increases the set sheet width by the adjustment amount Ay (S1810). Also, in the case where the pinch operation is a reduction operation (S1809: No), the information processing unit 402 decreases the set sheet width by the adjustment amount Ay (S1811).

Finally, the information processing unit 402 changes the sheet width of the rectangle 1701 displayed on the reception region 1700, in accordance with the set sheet width after change (S1813), and accordingly updates the set sheet width displayed on a sheet width display region 1730. After completion of Step S1812, the flow proceeds to Step S1802. In the case where no pinch operation is detected (S1802: No) and the CLOSE button 740 is touched (S1813: Yes), the size setting processing ends.

With this configuration, it is possible to cause the user to efficiently set the size of long non-standard size sheets by the pinch operation.

[7] Embodiment 7

Next, explanation is given on Embodiment 7 of the present invention. An image forming apparatus relating to the present embodiment has basically the common configuration with the above image forming apparatus relating to Embodiment 1. However, the image forming apparatus relating to the present embodiment changes the adjustment amounts Ax and Ay in accordance with whether or not the set sheet size is close to any standard size in addition to in accordance with the pinch operation angle. This is the difference from the image forming apparatus relating to Embodiment 1. The following explanation is given focusing on the difference.

Figure 19:
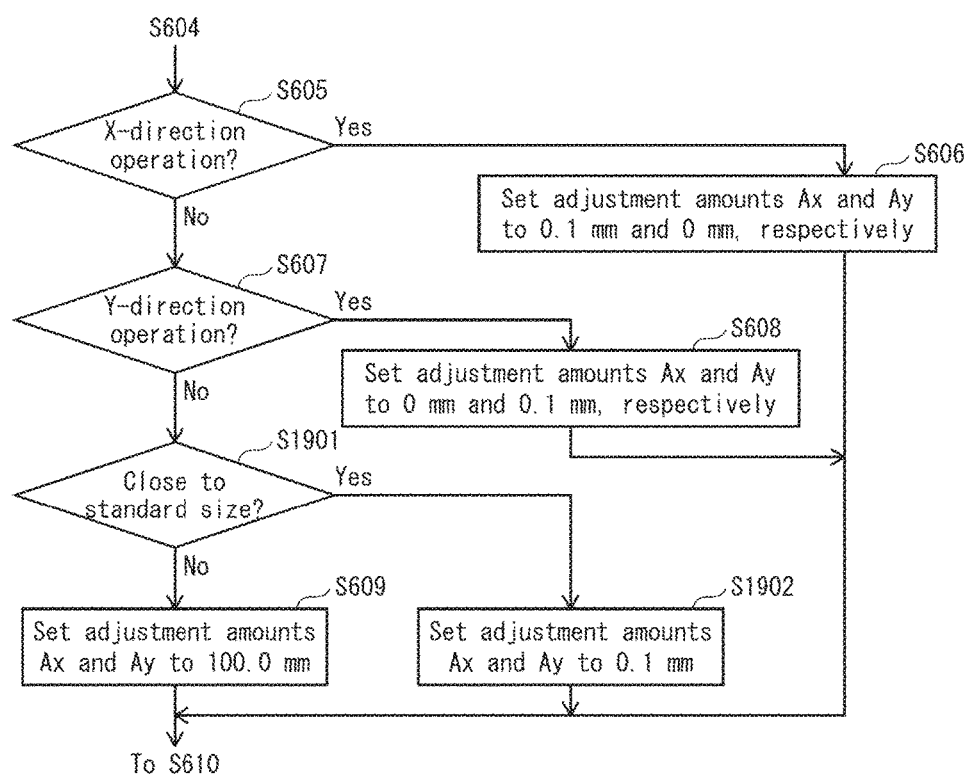
FIG. 19 is a flow chart showing operations of the controller 122 relating to Embodiment 7 of the present invention.

FIG. 19 is a flow chart showing operations of the controller 122 relating to the present embodiment, particularly showing parts different from the operations in FIG. 6. As shown in FIG. 19, in the case where a pinch operation is neither an X-direction nor a Y-direction operation (S605: No and S607: No), the controller 122 judges whether or not the set sheet size is close to any standard size in accordance with whether or not a current set sheet length Sx and a current set sheet width Sy fall within predetermined ranges relative to the sheet length and the sheet width of the standard size, respectively (S1901).

In the present embodiment, in the case where the current set sheet size is ±5.0 mm relative to the standard size, the set sheet size is judged to be close to the standard size. For example, the current set sheet length Sx and the current set sheet width Sy satisfy the following formula relative to a standard A4 size, the set sheet size is judged to be close to the standard A4 size. The same applies to standard sizes other than the standard A4 size.

$$297.0-5.0 \text{ mm} \le Sx \le 297.0+5.0 \text{ mm and } 210.0-5.0 \text{ mm} \le Sy \le 210.0+5.0 \text{ mm}$$

Or $$210.0-5.0 \text{ mm} \le Sx \le 210.0+5.0 \text{ mm and } 297.0-5.0 \text{ mm} \le Sy \le 297.0+5.0 \text{ mm}$$

In the case where the set sheet size is close to the standard size (S1901: Yes), the controller 122 sets both the adjustment amounts Ax and Ay to 0.1 mm (S1902), and otherwise (S1901: No) sets both the adjustment amounts Ax and Ay to 100.0 mm (S609).

Even with this configuration, it is possible to facilitate detailed setting the size of non-standard size sheets without causing the user to perform troublesome operations.

[8] Modifications

Although the present invention has been explained based on the above embodiments, the present invention is not of course limited to the above embodiments. The present invention may include the following modifications.

(1) In the above embodiments, the explanation has been given with use of the example in which the adjustment amounts Ax and Ay are set to 100.0 mm in accordance with the oblique operation, and the adjustment amounts Ax and Ay are set to 0.1 mm in accordance with the X-direction operation and the Y-direction operation. However, the present invention is of course not limited to this, and alternatively the adjustment amounts Ax and Ay each may differ between the X-direction operation and the Y-direction operation. In the case for example where the sheet length is larger than the sheet width, it is possible to further save the trouble of performing the pinch operation for size setting by setting the adjustment amount Ax to be larger than the adjustment amount Ay in accordance with the oblique operation.

(2) In the above embodiments, the explanation has been given with use of the example in which the adjustment amounts Ax and Ay are set to a predetermined value (100.0 mm) in accordance with the oblique operation. However, the present invention is of course not limited to this, and alternatively the adjustment amounts Ax and Ay may be set at a predetermined rate in accordance with the oblique operation. For example, the set sheet length and/or the set sheet width may be increased or decreased by a predetermined rate such as 5% in accordance with the oblique operation. Even with this configuration, it is possible to save the trouble of performing the pinch operation for size setting.

(3) In the above embodiments, the explanation has been given with use of the example in which the set sheet size is increased or decreased by the adjustment amounts Ax and Ay per pinch operation. However, the unit operation in the present invention is of course not limited to this. Alternatively, the set sheet size may be increased or decreased by the adjustment amounts Ax and Ay per unit operation that is increase or decrease of the distance between two touch positions resulting from the pinch operation by a predetermined value or larger. Even with this structure, it is possible to exhibit the same effects as those described above.

(4) In the above embodiments, the explanation has been given with use of the example in which it is judged as to whether or not the pinch operation is an oblique operation in accordance with whether or not the pinch operation angle is ±the threshold value relative to the X-coordinate axis or the Y-coordinate axis of the touch pad 201. However, the present invention is of course not limited to this, and alternatively the threshold value may differ between the X-coordinate axis and the Y-coordinate axis.

Specifically, it may be judged as to whether or not the pinch operation is an oblique operation in accordance with whether or not the pinch operation angle is ±α degrees (for example 10 degrees) relative to the X-coordinate axis or ±β degrees (for example 20 degrees) relative to the Y-coordinate axis. Note that the total value of α and β needs to be less than 90 in order to secure the angular range for the oblique operation.

The facility and precision of the pinch operation might differ depending on the direction of the pinch operation. Accordingly, by widening the angular range in a direction in which the user has difficulty performing the pinch operation, it is possible to further facilitate the precise size setting, thereby serving the user's convenience.

(5) In the above embodiments, the explanation has been given with use of the example in which the adjustment amount for the set size is switched in two stages between 0.1 mm and 100.0 mm in accordance with the pinch operation angle. However, the present invention is of course not limited to this, and alternatively the adjustment amount for the set size may be continuously changed in accordance with the pinch operation angle. For example, in the case for example where a pinch operation angle resulting from an oblique operation in the above embodiments is 45 degrees relative to one of the coordinate axes, as the pinch operation angle decreases from 45 degrees relative to the coordinate axis, the adjustment amount may be gradually decreased to 0.1 mm by the adjustment amount that is set to 100.0 mm.

(6) In the above embodiments, the explanation has been given with use of the example in which the image forming apparatus 1 is a color MFP. However, the present invention is of course not limited to this, and alternatively the present invention may be applicable to a monochrome MFP instead of a color MFP. Further, it is possible to exhibit the same effects as those described above through application of the present invention to a single function peripheral (SFP) such as a printer, a copier including a scanner, and a facsimile apparatus having a communication function.

(7) In the above embodiments, the explanation has been given with use of the example of an image forming apparatus. However, the present invention is of course not limited to this, and may be a program or digital signal that causes a computer to operate as an image forming apparatus. Further, the present invention may be a non-transitory computer-readable storage medium storing the program or digital signal, for example a flexible disk, hard disk, CD-ROM, MO, DVD, DVD-ROM, DVD-RAM, Blu-ray disc, or semiconductor memory. Further, the present invention may transmit the computer program or digital signal by electrical communication lines, wireless or wired means, a network such as the internet, or data broadcast. Further, the present invention may be a computer system equipped with a microprocessor and memory, the memory storing the computer program and the microprocessor executing the computer program. Further, by storing the computer program or digital signal on the storage medium and transferring the storage medium, or by transferring the computer program or digital signal via the network, or similar, the computer program or digital signal may be executed by another independent computer system.

[9] Summary

One aspect of the present invention provides an image forming apparatus comprising: a detection unit that detects a pinch operation that is an operation of increasing or decreasing a distance between two touch positions on a touch panel; an adjustment unit that, upon reception of setting of a size of a non-standard size sheet, adjusts the set size in accordance with the pinch operation; an angle specification unit that specifies, as a pinch operation angle resulting from the pinch operation, an angle formed by a straight line connecting the two touch positions and one of two orthogonal coordinate axes of a coordinate system of the touch pad; and an adjustment amount change unit that changes an adjustment amount for the set size per operation in accordance with whether the pinch operation angle falls within a first angular range or a second angular range that does not overlap the first angular range.

With this configuration, it is possible to switch the adjustment amount for the set size only by changing the pinch operation angle. This facilitates the detailed size setting of non-standard size sheets and switching of operations of large size change. Therefore, it is possible to cause the user to efficiently set the size of non-standard size sheets in detail by the pinch operation.

Also, in the one aspect of the present invention, the adjustment amount change unit may associate a first coordinate axis and a second coordinate axis, which are the two orthogonal coordinate axes, with a direction of a sheet length and a direction of a sheet width of the non-standard size sheet, respectively, the first angular range may include a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the third angular range, the adjustment amount change unit may adjust, as the set size, only the sheet length, when the pinch operation angle falls within the fourth angular range, the adjustment amount change unit may adjust, as the set size, only the sheet width, when the pinch operation angle falls within the second angular range, the adjustment amount change unit may adjust, as the set size, both the sheet length and the sheet width, and the adjustment amount may be larger when a direction of the pinch operation falls within the second angular range than when the direction of the pinch operation falls within the first angular range.

Also, in the one aspect of the present invention, the pinch operation may include a pinch-out operation and a pinch-in operation, the pinch-out operation may increase the distance between the two touch positions to increase the set size by the adjustment amount, and the pinch-in operation may decrease the distance between the two touch positions to decrease the set size by the adjustment amount.

Also, in the one aspect of the present invention, the image forming apparatus may further comprise a sheet size setting screen display unit that displays, on the touch panel, a sheet size setting screen for adjusting the set size, wherein only when the sheet size setting screen is displayed on the touch panel, the angle specification unit may specify the pinch operation angle.

Also, in the one aspect of the present invention, the adjustment amount change unit may include an adjustment amount display subunit that displays a magnitude of the adjustment amount on the touch panel.

Also, in the one aspect of the present invention, the image forming apparatus may further comprise: a storage unit that stores therein an upper limit value and a lower limit value of each of a sheet length and a sheet width of the non-standard size sheet that are settable; and a prohibition unit that, when at least one of the sheet length and the sheet width reaches the upper limit value or the lower limit value, prohibits setting of the at least one of the sheet length and the sheet width.

Also, in the one aspect of the present invention, the image forming apparatus may further comprise a numerical value input reception unit that receives setting of a sheet length and a sheet width of the non-standard size sheet via input of numerical values, wherein after the numerical value input reception unit may receive the setting, the adjustment amount change unit may decrease the adjustment amount that falls within the second angular range.

Also, in the one aspect of the present invention, the image forming apparatus may further comprise an overlay change unit that, when the pinch operation angle falls within the first angular range, changes a set size of an overlaid image by a predetermined adjustment amount, and when the pinch operation angle falls within the second angular range, changes the set size of the image to one of standard sizes that is the closest to a current set size of the image.

Also, in the one aspect of the present invention, the overlay change unit may associate a first coordinate axis and a second coordinate axis, which are the two orthogonal coordinate axes, with a direction of a length and a direction of a width of the image, respectively, the first angular range may include a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the third angular range, the overlay change unit may adjust, as the set size, the length of the image, and when the pinch operation angle falls within the fourth angular range, the overlay change unit may adjust, as the set size, the width of the image.

Also, in the one aspect of the present invention, when the pinch operation angle falls within the second angular range and the pinch operation is a pinch-out operation of increasing the distance between the two touch positions, the overlay change unit may increase the set size of the image to the standard size, and when the pinch operation angle falls within the second angular range and the pinch operation is a pinch-in operation of decreasing the distance between the two touch positions, the overlay change unit may decrease the set size of the image to the standard size.

Also, in the one aspect of the present invention, the image forming apparatus may further comprise an overlay setting screen unit that displays, on the touch panel, an overlay setting screen for changing the set size of the image, wherein only when the overlay setting screen may be displayed on the touch panel, the angle specification unit specifies the pinch operation angle.

Also, in the one aspect of the present invention, the image forming apparatus may further comprise a long sheet judgment unit that judges whether or not the non-standard size sheet is a long sheet, wherein when the long sheet judgment unit judges that the non-standard size sheet is a long sheet, the adjustment amount change unit may associate a first coordinate axis and a second coordinate axis, which are the two orthogonal coordinate axes, with a direction of a sheet length and a direction of a sheet width of the non-standard size sheet, respectively, the first angular range may include a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the first angular range or the second angular range, the adjustment amount change unit may adjust, as the set size, only the sheet width, and the adjustment amount may be larger when a direction of the pinch operation falls within the second angular range than when the direction of the pinch operation falls within the first angular range.

Also, in the one aspect of the present invention, the image forming apparatus may further comprise a size judgment unit that judges whether a current set size falls within a predetermined range relative to any of standard sizes, wherein when the pinch operation angle falls within the second angular range, the adjustment amount may be smaller when the current set size falls within the predetermined range relative to any of the standard sizes than when the current set size is out of the predetermined range relative to all of the standard sizes.

Also, in the one aspect of the present invention, the image forming apparatus may change the set size by the adjustment amount each time the distance between the two touch positions changes by a predetermined amount.

Another aspect of the present invention provides a non-transitory computer-readable storage medium on which is stored a program that causes a computer to execute: a detection step of detecting a pinch operation that is an operation of increasing or decreasing a distance between two touch positions on a touch panel; an adjustment step of, upon reception of setting of a size of a non-standard size sheet, adjusting the set size in accordance with the pinch operation; an angle specification step of specifying, as a pinch operation angle resulting from the pinch operation, an angle formed by a straight line connecting the two touch positions and one of two orthogonal coordinate axes of a coordinate system of the touch pad; and an adjustment amount change step of changing an adjustment amount for the set size per operation in accordance with whether the pinch operation angle falls within a first angular range or a second angular range that does not overlap the first angular range.

Also, in the other aspect of the present invention, the adjustment amount change step may associate a first coordinate axis and a second coordinate axis, which are the two orthogonal coordinate axes, with a direction of a sheet length and a direction of a sheet width of the non-standard size sheet, respectively, the first angular range may include a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the third angular range, the adjustment amount change step may adjust, as the set size, only the sheet length, when the pinch operation angle falls within the fourth angular range, the adjustment amount change step may adjust, as the set size, only the sheet width, when the pinch operation angle falls within the second angular range, the adjustment amount change step may adjust, as the set size, both the sheet length and the sheet width, and the adjustment amount may be larger when a direction of the pinch operation falls within the second angular range than when the direction of the pinch operation falls within the first angular range.

Also, in the other aspect of the present invention, the pinch operation may include a pinch-out operation and a pinch-in operation, the pinch-out operation may increase the distance between the two touch positions to increase the set size by the adjustment amount, and the pinch-in operation may decrease the distance between the two touch positions to decrease the set size by the adjustment amount.

Also, in the other aspect of the present invention, the program may further cause the computer to execute a sheet size setting screen display step of displaying, on the touch panel, a sheet size setting screen for adjusting the set size, wherein only when the sheet size setting screen is displayed on the touch panel, the angle specification step may specify the pinch operation angle.

Also, in the other aspect of the present invention, the adjustment amount change step may include an adjustment amount display substep of displaying a magnitude of the adjustment amount on the touch panel.

Also, in the other aspect of the present invention, the program may further cause the computer to execute: a storage step of storing an upper limit value and a lower limit value of each of a sheet length and a sheet width of the non-standard size sheet that are settable; and a prohibition step of, when at least one of the sheet length and the sheet width reaches the upper limit value or the lower limit value, prohibiting setting of the at least one of the sheet length and the sheet width.

Also, in the other aspect of the present invention, the program may further cause the computer to execute a numerical value input reception step of receiving setting of a sheet length and a sheet width of the non-standard size sheet via input of numerical values, wherein after the numerical value input reception step receives the setting, the adjustment amount change step may decrease the adjustment amount that falls within the second angular range.

Also, in the other aspect of the present invention, the program may further cause the computer to execute an overlay change step of, when the pinch operation angle falls within the first angular range, changing a set size of an overlaid image by a predetermined adjustment amount, and when the pinch operation angle falls within the second angular range, changing the set size of the image to one of standard sizes that is the closest to a current set size of the image.

Also, in the other aspect of the present invention, the overlay change step may associate a first coordinate axis and a second coordinate axis, which are the two orthogonal coordinate axes, with a direction of a length and a direction of a width of the image, respectively, the first angular range may include a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the third angular range, the overlay change step may adjust, as the set size, the length of the image, and when the pinch operation angle falls within the fourth angular range, the overlay change step may adjust, as the set size, the width of the image.

Also, in the other aspect of the present invention, when the pinch operation angle falls within the second angular range and the pinch operation is a pinch-out operation of increasing the distance between the two touch positions, the overlay change step may increase the set size of the image to the standard size, and when the pinch operation angle falls within the second angular range and the pinch operation is a pinch-in operation of decreasing the distance between the two touch positions, the overlay change step may decrease the set size of the image to the standard size.

Also, in the other aspect of the present invention, the program may further cause the computer to execute an overlay setting screen step of displaying, on the touch panel, an overlay setting screen for changing the set size of the image, wherein only when the overlay setting screen is displayed on the touch panel, the angle specification step may specify the pinch operation angle.

Also, in the other aspect of the present invention, the program may further cause the computer to execute a long sheet judgment step of judging whether or not the non-standard size sheet is a long sheet, wherein when the long sheet judgment step judges that the non-standard size sheet is a long sheet, the adjustment amount change step may associate a first coordinate axis and a second coordinate axis, which are the two orthogonal coordinate axes, with a direction of a sheet length and a direction of a sheet width of the non-standard size sheet, respectively, the first angular range may include a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the first angular range or the second angular range, the adjustment amount change step may adjust, as the set size, only the sheet width, and the adjustment amount may be larger when a direction of the pinch operation falls within the second angular range than when the direction of the pinch operation falls within the first angular range.

Also, in the other aspect of the present invention, the program may further cause the computer to execute a size judgment step of judging whether a current set size falls within a predetermined range relative to any of standard sizes, wherein when the pinch operation angle falls within the second angular range, the adjustment amount may be smaller when the current set size falls within the predetermined range relative to any of the standard sizes than when the current set size is out of the predetermined range relative to all of the standard sizes.

Also, in the other aspect of the present invention, the program may cause the computer to change the set size by the adjustment amount each time the distance between the two touch positions changes by a predetermined amount.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image forming apparatus comprising:
    a detection unit that detects a pinch operation that is an operation of increasing or decreasing a distance between two touch positions on a touch panel;
    a hardware processor configured to:
    upon reception of setting of a size of a non-standard size sheet, adjust the set size in accordance with the pinch operation;
    specify, as a pinch operation angle resulting from the pinch operation, an angle formed by a straight line connecting the two touch positions and one of two orthogonal coordinate axes of a coordinate system of the touch pad; and
    change an adjustment amount for the set size per operation in accordance with whether the pinch operation angle falls within a first angular range or a second angular range that does not overlap the first angular range.

2. The image forming apparatus of claim 1, wherein
    the hardware processor associates a first coordinate axis and a second coordinate axis, which are the two orthogonal coordinate axes, with a direction of a sheet length and a direction of a sheet width of the non-standard size sheet, respectively,
    the first angular range includes a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied,
    when the pinch operation angle falls within the third angular range, the hardware processor adjusts, as the set size, only the sheet length,
    when the pinch operation angle falls within the fourth angular range, the hardware processor adjusts, as the set size, only the sheet width,
    when the pinch operation angle falls within the second angular range, the hardware processor adjusts, as the set size, both the sheet length and the sheet width, and
    the adjustment amount is larger when a direction of the pinch operation falls within the second angular range than when the direction of the pinch operation falls within the first angular range.

3. The image forming apparatus of claim 1, wherein
    the pinch operation includes a pinch-out operation and a pinch-in operation, the pinch-out operation increases the distance between the two touch positions to increase the set size by the adjustment amount, and the pinch-in operation decreases the distance between the two touch positions to decrease the set size by the adjustment amount.

4. The image forming apparatus of claim 1, wherein the hardware processor is further configured to:

display, on the touch panel, a sheet size setting screen for adjusting the set size, wherein only when the sheet size setting screen is displayed on the touch panel, the angle specification unit specifies the pinch operation angle.

5. The image forming apparatus of claim 1, wherein the hardware processor includes an adjustment amount display subunit that displays a magnitude of the adjustment amount on the touch panel.

6. The image forming apparatus of claim 1, wherein the hardware processor is further configured to:

store an upper limit value and a lower limit value of each of a sheet length and a sheet width of the non-standard size sheet that are settable; and when at least one of the sheet length and the sheet width reaches the upper limit value or the lower limit value, prohibit setting of the at least one of the sheet length and the sheet width.

7. The image forming apparatus of claim 1, wherein the hardware processor is further configured to:

receive setting of a sheet length and a sheet width of the non-standard size sheet via input of numerical values, wherein after the hardware processor receives the setting, the hardware processor decreases the adjustment amount that falls within the second angular range.

8. The image forming apparatus of claim 1, wherein the hardware processor is further configured to:

when the pinch operation angle falls within the first angular range, change a set size of an overlaid image by a predetermined adjustment amount, and when the pinch operation angle falls within the second angular range, change the set size of the image to one of standard sizes that is the closest to a current set size of the image.

9. The image forming apparatus of claim 8, wherein

The hardware processor associates a first coordinate axis and a second coordinate axis, which are the two orthogonal coordinate axes, with a direction of a length and a direction of a width of the image, respectively, the first angular range includes a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the third angular range, the hardware processor adjusts, as the set size, the length of the image, and when the pinch operation angle falls within the fourth angular range, the hardware processor adjusts, as the set size, the width of the image.

10. The image forming apparatus of claim 8, wherein when the pinch operation angle falls within the second angular range and the pinch operation is a pinch-out operation of increasing the distance between the two touch positions, the hardware processor increases the set size of the image to the standard size, and when the pinch operation angle falls within the second angular range and the pinch operation is a pinch-in operation of decreasing the distance between the two touch positions, the hardware processor decreases the set size of the image to the standard size.

11. The image forming apparatus of claim 8, wherein the hardware processor is further configured to:

display, on the touch panel, an overlay setting screen for changing the set size of the image, wherein only when the overlay setting screen is displayed on the touch panel, the hardware processor specifies the pinch operation angle.

12. The image forming apparatus of claim 1, wherein the hardware processor is further configured to:

judge whether or not the non-standard size sheet is a long sheet, wherein when the hardware processor judges that the non-standard size sheet is a long sheet, the hardware processor associates a first coordinate axis and a second coordinate axis, which are the two orthogonal coordinate axes, with a direction of a sheet length and a direction of a sheet width of the non-standard size sheet, respectively, the first angular range includes a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the first angular range or the second angular range, the hardware processor adjustment amount change unit adjusts, as the set size, only the sheet width, and the adjustment amount is larger when a direction of the pinch operation falls within the second angular range than when the direction of the pinch operation falls within the first angular range.

13. The image forming apparatus of claim 1, wherein the hardware processor is further configured to:

judge whether a current set size falls within a predetermined range relative to any of standard sizes, wherein when the pinch operation angle falls within the second angular range, the adjustment amount is smaller when the current set size falls within the predetermined range relative to any of the standard sizes than when the current set size is out of the predetermined range relative to all of the standard sizes.

14. The image forming apparatus of claim 1, further comprising changing the set size by the adjustment amount each time the distance between the two touch positions changes by a predetermined amount.

15. A non-transitory computer-readable storage medium on which is stored a program that causes a computer to execute:

a detection step of detecting a pinch operation that is an operation of increasing or decreasing a distance between two touch positions on a touch panel;

an adjustment step of, upon reception of setting of a size of a non-standard size sheet, adjusting the set size in accordance with the pinch operation;

an angle specification step of specifying, as a pinch operation angle resulting from the pinch operation, an angle formed by a straight line connecting the two touch positions and one of two orthogonal coordinate axes of a coordinate system of the touch pad; and an adjustment amount change step of changing an adjustment amount for the set size per operation in accordance with whether the pinch operation angle falls within a first angular range or a second angular range that does not overlap the first angular range.

16. The storage medium of claim 15, wherein
the adjustment amount change step associates a first coordinate axis and a second coordinate axis, which are the two orthogonal coordinate axes, with a direction of a sheet length and a direction of a sheet width of the non-standard size sheet, respectively,
the first angular range includes a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied,
when the pinch operation angle falls within the third angular range, the adjustment amount change step adjusts, as the set size, only the sheet length,
when the pinch operation angle falls within the fourth angular range, the adjustment amount change step adjusts, as the set size, only the sheet width,
when the pinch operation angle falls within the second angular range, the adjustment amount change step adjusts, as the set size, both the sheet length and the sheet width, and
the adjustment amount is larger when a direction of the pinch operation falls within the second angular range than when the direction of the pinch operation falls within the first angular range.

17. The storage medium of claim 15, wherein
the pinch operation includes a pinch-out operation and a pinch-in operation,
the pinch-out operation increases the distance between the two touch positions to increase the set size by the adjustment amount, and
the pinch-in operation decreases the distance between the two touch positions to decrease the set size by the adjustment amount.

18. The storage medium of claim 15, the program further causing the computer to execute:
a sheet size setting screen display step of displaying, on the touch panel, a sheet size setting screen for adjusting the set size, wherein
only when the sheet size setting screen is displayed on the touch panel, the angle specification step specifies the pinch operation angle.

19. The storage medium of claim 15, wherein
the adjustment amount change step includes an adjustment amount display substep of displaying a magnitude of the adjustment amount on the touch panel.

20. The storage medium of claim 15, the program further causing the computer to execute:
a storage step of storing an upper limit value and a lower limit value of each of a sheet length and a sheet width of the non-standard size sheet that are settable; and
a prohibition step of, when at least one of the sheet length and the sheet width reaches the upper limit value or the lower limit value, prohibiting setting of the at least one of the sheet length and the sheet width.

21. The storage medium of claim 15, the program further causing the computer to execute:
a numerical value input reception step of receiving setting of a sheet length and a sheet width of the non-standard size sheet via input of numerical values, wherein
after the numerical value input reception step receives the setting, the adjustment amount change step decreases the adjustment amount that falls within the second angular range.

22. The storage medium of claim 15, the program further causing the computer to execute:
an overlay change step of, when the pinch operation angle falls within the first angular range, changing a set size of an overlaid image by a predetermined adjustment amount, and when the pinch operation angle falls within the second angular range, changing the set size of the image to one of standard sizes that is the closest to a current set size of the image.

23. The storage medium of claim 22, wherein
the overlay change step associates a first coordinate axis and a second coordinate axis, which are the two orthogonal coordinate axes, with a direction of a length and a direction of a width of the image, respectively,
the first angular range includes a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied,
when the pinch operation angle falls within the third angular range, the overlay change step adjusts, as the set size, the length of the image, and
when the pinch operation angle falls within the fourth angular range, the overlay change step adjusts, as the set size, the width of the image.

24. The storage medium of claim 22, wherein
when the pinch operation angle falls within the second angular range and the pinch operation is a pinch-out operation of increasing the distance between the two touch positions, the overlay change step increases the set size of the image to the standard size, and
when the pinch operation angle falls within the second angular range and the pinch operation is a pinch-in operation of decreasing the distance between the two touch positions, the overlay change step decreases the set size of the image to the standard size.

25. The storage medium of claim 22, the program further causing the computer to execute:
an overlay setting screen step of displaying, on the touch panel, an overlay setting screen for changing the set size of the image, wherein
only when the overlay setting screen is displayed on the touch panel, the angle specification step specifies the pinch operation angle.

26. The storage medium of claim 15, the program further causing the computer to execute:
a long sheet judgment step of judging whether or not the non-standard size sheet is a long sheet, wherein
when the long sheet judgment step judges that the non-standard size sheet is a long sheet, the adjustment amount change step associates a first coordinate axis and a second coordinate axis, which are the two orthogonal coordinate axes, with a direction of a sheet length and a direction of a sheet width of the non-standard size sheet, respectively,
the first angular range includes a third angular range and a fourth angular range, the third angular range being a range in which the pinch operation angle is ±α degrees relative to the first coordinate axis, the fourth angular range being a range in which the pinch operation angle is ±β degrees relative to the second coordinate axis, where α+β<90 is satisfied, when the pinch operation angle falls within the first angular range or the second angular range, the adjustment amount change step adjusts, as the set size, only the sheet width, and the adjustment amount is larger when a direction of the pinch operation falls within the second angular range than when the direction of the pinch operation falls within the first angular range.

27. The storage medium of claim 15, the program further causing the computer to execute:

a size judgment step of judging whether a current set size falls within a predetermined range relative to any of standard sizes, wherein when the pinch operation angle falls within the second angular range, the adjustment amount is smaller when the current set size falls within the predetermined range relative to any of the standard sizes than when the current set size is out of the predetermined range relative to all of the standard sizes.

28. The storage medium of claim 15 wherein the program causes the computer to change the set size by the adjustment amount each time the distance between the two touch positions changes by a predetermined amount.

\* \* \* \* \*